(12) United States Patent
Sugaya

(10) Patent No.: US 8,385,265 B2
(45) Date of Patent: Feb. 26, 2013

(54) WIRELESS COMMUNICATION DEVICE, WIRELESS COMMUNICATION SYSTEM AND WIRELESS COMMUNICATION METHOD

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 644 days.

(21) Appl. No.: 12/614,759

(22) Filed: Nov. 9, 2009

(65) Prior Publication Data

US 2010/0118785 A1 May 13, 2010

(30) Foreign Application Priority Data

Nov. 10, 2008 (JP) ................................. 2008-287514

(51) Int. Cl.
*H04W 4/00* (2009.01)
*H04B 7/216* (2006.01)
(52) U.S. Cl. ......... 370/328; 370/329; 370/335; 370/338
(58) Field of Classification Search .................. 370/229, 370/329, 335, 338
See application file for complete search history.

(56) References Cited

U.S. PATENT DOCUMENTS

| 2004/0047314 | A1* | 3/2004 | Li ................................. | 370/335 |
| 2007/0036074 | A1* | 2/2007 | Tsai et al. ..................... | 370/229 |
| 2007/0133459 | A1* | 6/2007 | Kim et al. ..................... | 370/329 |
| 2007/0291725 | A1* | 12/2007 | Kowalski ..................... | 370/338 |
| 2008/0037488 | A1* | 2/2008 | Fantaske ....................... | 370/338 |
| 2008/0062939 | A1* | 3/2008 | Horn et al. .................... | 370/338 |
| 2008/0130565 | A1* | 6/2008 | Jeong et al. ................... | 370/329 |
| 2009/0109943 | A1 | 4/2009 | Yomo et al. | |

FOREIGN PATENT DOCUMENTS

| JP | 2006-303735 | 11/2006 |
| JP | 2007-67472 | 3/2007 |
| JP | 2007-129423 | 5/2007 |
| WO | WO 2005/117354 A1 | 12/2005 |

OTHER PUBLICATIONS

Office Action issued Aug. 17, 2010, in Japan Patent Application No. 2008-287514.

* cited by examiner

*Primary Examiner* — Brandon Renner
(74) *Attorney, Agent, or Firm* — Oblon, Spivak, McClelland, Maier & Neustadt, L.L.P.

(57) ABSTRACT

A wireless communication device includes: a reception portion that receives a transmission request signal addressed to the wireless communication device that is transmitted from a counterpart communication device; a determination portion that, when the reception portion receives the transmission request signal, determines whether data transmission from the counterpart communication device is possible, based on an availability of a wireless transmission path; a suspension control portion that, when it is determined that the data transmission from the counterpart communication device is not possible, performs transmission control of a suspension request signal that requests suspension of the data transmission; and a response control portion that, when the determination portion determines that the data transmission from the counterpart communication device is possible after the transmission control of the suspension request signal, performs transmission control of a response signal in response to the transmission request signal addressed to the wireless communication device.

10 Claims, 25 Drawing Sheets

FIG. 5

| DRP Information Element (DRP RESERVATION INFORMATION ELEMENT) ||||||
|---|---|---|---|---|---|
| Element ID | Length | DRP Control | Target/Owner DevAddr | DRP Allocation 1 ... | DRP Allocation N |
| 621 | 622 | 623 | 624 | 625 | 626 |

FIG. 6

| PCA Availability Information Element ||||
|---|---|---|---|
| Element ID | Length | Interpretatin | PCA Availability Bitmap |
| 631 | 632 | 633 | 634 |

FIG. 7

| Traffic Indication Map Information Element (TIMIE) |||||
|---|---|---|---|---|
| Element ID | Length | DevAddr 1 | ... | DevAddr 1 |
| 641 | 642 | 643 | | 644 |

WIRELESS COMMUNICATION DEVICE, WIRELESS COMMUNICATION SYSTEM AND WIRELESS COMMUNICATION METHOD

BACKGROUND OF THE INVENTION

1. Field of the Invention

The present invention relates to a wireless communication device, a wireless communication system and a wireless communication method.

2. Description of the Related Art

Recently, a high-speed personal area network that uses an ultra wideband wireless communication system has been proposed. Further, in this high-speed personal area network, it has been proposed that a given wireless communication device and wireless communication devices in the vicinity form an ad hoc network in an autonomous and distributed way to perform communication. Note that the regulations for performing communication under autonomous distributed control are defined by, for example, the Distributed Media Access Control Layer Specification established by the WiMedia Alliance.

Further, a known type of access control in the wireless communication field is request to send/clear to send (RTS/CTS) control. It is thought that, if the RTS/CTS control is used, a hidden terminal that is hidden from a transmission source device can be notified that data transmission is being performed from the transmission source device.

Further, partial improvements in the RTS/CTS control have been proposed from various quarters. For example, Japanese Patent Application Publication No. JP-A-2007-67472 describes a wireless communication device that, when it receives an RTS addressed to another device but does not receive a CTS in response to the RTS, performs data transmission in a data transmission period (originally, a period to set a NAV) described in the RTS.

SUMMARY OF THE INVENTION

However, in the normal RTS/CTS control, if a receiving destination device of an RTS does not send a CTS back, the transmission source device of the RTS repeatedly retransmits the RTS. As a result, communication in the vicinity is restricted. Further, the wireless communication device described in Japanese Patent Application Publication No. JP-A-2007-67472 performs data transmission in the period to set the NAV. Therefore, there is a possibility of a conflict with data transmission performed by the transmission source device of the RTS.

In light of the foregoing, it is desirable to provide a novel and improved wireless communication device, wireless communication system and wireless communication method capable of improving use efficiency of a wireless transmission path.

According to an embodiment of the present invention, there is provided a wireless communication device including a reception portion that receives a transmission request signal addressed to the wireless communication device that is transmitted from a counterpart communication device, a determination portion that, when the reception portion receives the transmission request signal addressed to the wireless communication device, determines whether data transmission from the counterpart communication device is possible, based on an availability of a wireless transmission path, a suspension control portion that, when it is determined that the data transmission from the counterpart communication device is not possible, performs transmission control of a suspension request signal that requests suspension of the data transmission, a response control portion that, when the determination portion determines that the data transmission from the counterpart communication device is possible after the transmission control of the suspension request signal, performs transmission control of a response signal in response to the transmission request signal addressed to the wireless communication device.

When the data transmission from the counterpart communication device conflicts with data transmission from another wireless communication device, the determination portion may determine that the data transmission from the counterpart communication device is not possible, and when the data transmission from the counterpart communication device does not conflict with data transmission from other wireless communication devices, the determination portion may determine that the data transmission from the counterpart communication device is possible.

The determination portion may detect that the data transmission from the other wireless communication device is performed, based on reception by the reception portion of a transmission request signal transmitted from the other wireless communication device.

The determination portion may determine that the data transmission from the counterpart communication device is possible after the data transmission from the other wireless communication device is completed.

If data retransmission from the other wireless communication device is not performed in a predetermined time after the data transmission from the other wireless communication device, the determination portion may determine that the data transmission from the counterpart communication device is possible.

According to another embodiment of the present invention, there is provided a wireless communication device including a transmission request control portion that performs transmission control of a transmission request signal to a counterpart communication device a transmission portion that performs data transmission when a response signal in response to the transmission request signal is received from the counterpart communication device. The transmission request control portion performs retransmission control of the transmission request signal when both the response signal and a suspension request signal are not received after the transmission control of the transmission request signal, and the transmission request control portion does not perform the retransmission control of the transmission request signal when the suspension request signal is received.

The transmission request control portion may perform the retransmission control of the transmission request signal when the response signal is not received in a predetermined time after the suspension request signal has been received.

According to another embodiment of the present invention, there is provided a wireless communication system including a first wireless communication device, and a second wireless communication device including a reception portion that receives a transmission request signal addressed to the second wireless communication device that is transmitted from the first wireless communication device, a determination portion that, when the reception portion receives the transmission request signal addressed to the second wireless communication device, determines whether data transmission from the first wireless communication device is possible, based on an availability of a wireless transmission path, a suspension control portion that, when it is determined that the data transmission from the first wireless communication device is not possible, performs transmission control of a suspension request signal that requests suspension of the data transmission, and a response control portion that, when the determination portion determines that the data transmission from the first wireless communication device is possible after the transmission control of the suspension request signal, performs transmission control of a response signal in response to the transmission request signal addressed to the second wireless communication device. The first wireless communication device performs retransmission control of the transmission request signal when both the response signal and the suspension request signal are not received after the transmission control of the transmission request signal, and the first wireless communication device does not perform the retransmission control of the transmission request signal when the suspension request signal is received.

According to another embodiment of the present invention, there is provided a wireless communication method including the steps of receiving a transmission request signal addressed to the wireless communication device that is transmitted from a counterpart communication device, determining, based on an availability of a wireless transmission path, whether data transmission from the counterpart communication device is possible, performing transmission control of a suspension request signal that requests suspension of the data transmission, when it is determined that the data transmission from the counterpart communication device is not possible, and performing transmission control of a response signal in response to the transmission request signal addressed to the wireless communication device, when the data transmission from the counterpart communication device becomes possible after the transmission control of the suspension request signal.

According to another embodiment of the present invention, there is provided a wireless communication method including the steps of, performing transmission control of a transmission request signal to a counterpart communication device, and performing data transmission when a response signal in response to the transmission request signal is received from the counterpart communication device. Retransmission control of the transmission request signal is performed when both the response signal and a suspension request signal are not received after the transmission control of the transmission request signal, and the retransmission control of the transmission request signal is not performed when the suspension request signal is received.

As described above, according to the wireless communication device, the wireless communication system and the wireless communication method, it is possible to improve the use efficiency of the wireless transmission path.

BRIEF DESCRIPTION OF THE DRAWINGS

FIG. 5 is an explanatory diagram showing an example of the structure of a DRP reservation information element that is an information element included in a beacon;

FIG. 6 is an explanatory diagram showing an example of the structure of a PCA availability information element that is an information element included in a beacon;

FIG. 7 is an explanatory diagram showing an example of the structure of a traffic indication map information element that is an information element included in a beacon;

DETAILED DESCRIPTION OF EMBODIMENT

Figure 1:
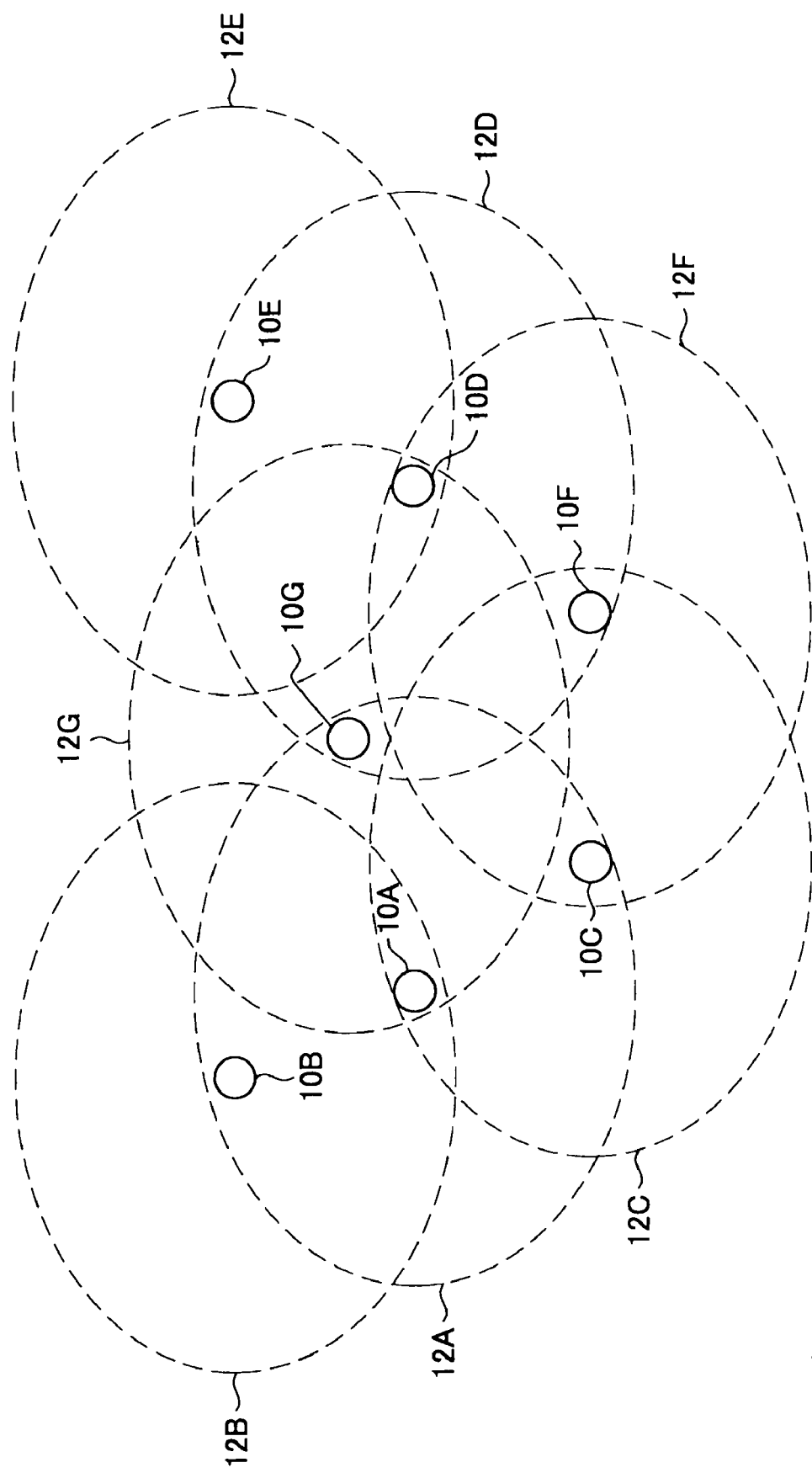
FIG. 1 is an explanatory diagram showing the configuration of a wireless communication system according to the present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An exemplary embodiment of the present invention will be described in the following order.

1. Overview of a wireless communication system according to the present embodiment
   Example of the configuration of the wireless communication system
   Time sharing control
   Structure of each frame
2. Background of the present embodiment
3. Configuration of a wireless communication device according to the present embodiment
4. Operation of the wireless communication devices according to the present embodiment
5. Summary and supplement

1. Overview of a Wireless Communication System According to the Present Embodiment Example of the Configuration of the Wireless Communication System First, an example of the structure of a wireless communication system 1 according to the present embodiment will be described with reference to FIG. 1.

FIG. 1 is an explanatory diagram showing the configuration of the wireless communication system 1 according to the present embodiment. The wireless communication system 1 includes wireless communication devices 10A to 10G. Each of the wireless communication devices 10A to 10G can communicate with wireless communication devices included in their respective radio wave reachable ranges 12A to 12G, in an autonomous and distributed way.

More specifically, the wireless communication device 10A can communicate with the wireless communication device 10B, 10C and 10G that are included in the radio wave reachable range 12A. The wireless communication device 10B can communicate with the wireless communication device 10A that is included in the radio wave reachable range 12B. Further, the wireless communication device 10C can communicate with the wireless communication devices 10A and 10F that are included in the radio wave reachable range 12C.

Similarly, the wireless communication device 10D can communicate with the wireless communication devices 10E, 10F and 10G that are included in the radio wave reachable range 12D. The wireless communication device 10E can communicate with the wireless communication device 10D that is included in the radio wave reachable range 12E. Further, the wireless communication device 10F can communicate with the wireless communication devices 10C and 10D that are included in the radio wave reachable range 12F. Further, the wireless communication device 10G can communicate with the wireless communication devices 10A and 10D that are included in the radio wave reachable range 12G.

The above-described wireless communication devices 10A to 10G transmit and receive beacons, which are an example of communication management information, at a predetermined cycle, and form an autonomous distributed wireless network (an ad hoc network). Thus, the wireless communication devices 10A to 10G that form the wireless network can transmit and receive various types of transmission data. The various types of transmission data may include audio data such as music, a lecture, a radio program, or the like, visual data such as a motion picture, a television program, a video program, a photograph, a document, a painting, a diagram, or the like, and any other type of data, such as a game, software, or the like.

Note that, in the description hereinafter, when it is not necessary to specifically distinguish between the wireless communication devices 10A to 10G, the term wireless communication device(s) 10 alone will be used. Further, when it is not necessary to specifically distinguish between the radio wave reachable ranges 12A to 12G, the term radio wave reachable range(s) 12 will be used. Further, FIG. 1 shows the wireless communication system 1 and also shows the wireless network. Therefore, it can be understood that the terms wireless communication system 1 and wireless network can be almost synonymously used. However, generally, the term network indicates a structure including links in addition to nodes (wireless communication devices). Accordingly, it can also be understood that the wireless network is different from the wireless communication system 1 in that the wireless network includes links in addition to the wireless communication devices 10A to 10G.

Each of the wireless communication devices 10 may be any information processing device such as a personal computer (PC), a household image processing device (a DVD recorder, a video deck or the like), a mobile phone, a personal handy-phone system (PHS), a mobile music playback device, a mobile image processing device, a personal digital assistant (PDA), a household game console, a mobile game machine, a household appliance, or the like. Further, the wireless communication devices 10 may be externally connected to these information processing devices that function as application devices, or built into them.

Time Sharing Control

One example of the configuration of the autonomous distributed wireless communication system 1 is described above. Next, a super frame for time sharing control in the wireless communication system 1 will be described with reference to FIG. 2.

Figure 2:
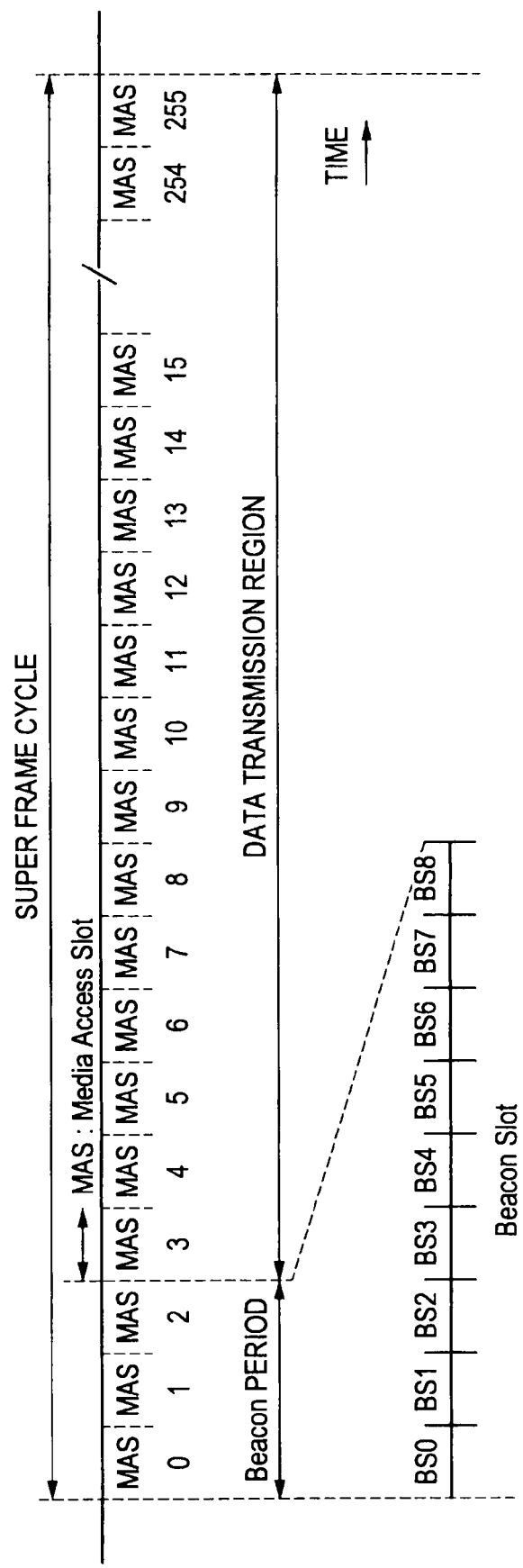
FIG. 2 is an explanatory diagram showing an example of the structure of a super frame.

FIG. 2 is an explanatory diagram showing an example of the structure of a super frame. The super frame cycle is defined by a predetermined time (for example, 65 ms), and is divided into 256 media access slots (MAS). The wireless communication devices 10 that form one wireless network share the super frame cycle as a specified period frame, and the divided MAS are used as units to transfer messages.

In addition, there is a beacon period (BP) that serves as a management domain for transmitting and receiving management information using a beacon at the head of the super frame, and beacon slots (BS) are arranged at specified intervals. Each wireless communication device 10 is set with a specified beacon slot, and can exchange parameters for performing network management or access control with the wireless communication devices 10 in the vicinity. FIG. 2 shows an example in which 9 beacon slots are set, namely, BS0 to BS8, as the beacon period. Note that, the period that is not set as the beacon period is normally used as a data transmission region.

In the wireless communication system 1, each of the wireless communication devices 10 performs a distributed reservation protocol (DRP) reservation for each MAS shown in FIG. 2, and performs communication in the DRP-reserved MAS. Reservation types of the DRP reservation include the followings.

(1) Alien BP
(2) Hard DRP
(3) Soft DRP
(4) Private DRP
(5) Prioritized Contention Access (PCA)

None of the wireless communication devices 10 included in the wireless communication system 1 transmit any signals in the MAS that has been reserved by the DRP reservation, which has the reservation type Alien BP. Further, in the MAS that has been reserved by the DRP reservation, which has the reservation type Hard DRP, only the wireless communication device(s) 10 that is (are) a reservation source or a reservation destination of the DRP reservation can perform wireless communication.

On the other hand, in the MAS that has been reserved by the DRP reservation, which has the reservation type Soft DRP or PCA, contention communication is performed. For example, when data is to be transmitted from the wireless communication device 10A to the wireless communication device 10B, the wireless communication device 10A transmits a request to send (RTS) to the wireless communication device 10B as a transmission request signal, in the MAS that has been reserved by the DRP reservation, which has the reservation type Soft DRP or PCA. When the wireless communication device 10B receives the RTS, it transmits a clear to send (CTS) to the wireless communication device 10A as a response signal.

Further, when the wireless communication device 10A receives the CTS from the wireless communication device 10B, it determines that the wireless communication device 10A has a data transmission right, and starts data transmission. If the wireless communication device 10B correctly receives data from the wireless communication device 10A, it transmits an acknowledgement (ACK) to the wireless communication device 10A as a confirmation signal. Thus, a series of wireless communications are completed.

Hereinafter, an example of the frame structure of the above-described RTS/CTS and the like, and the frame structure of a beacon and the like used to perform DRP reservation will be described.

Structure of Each Frame

Example of the Structure of a PHY Frame

Figure 3:
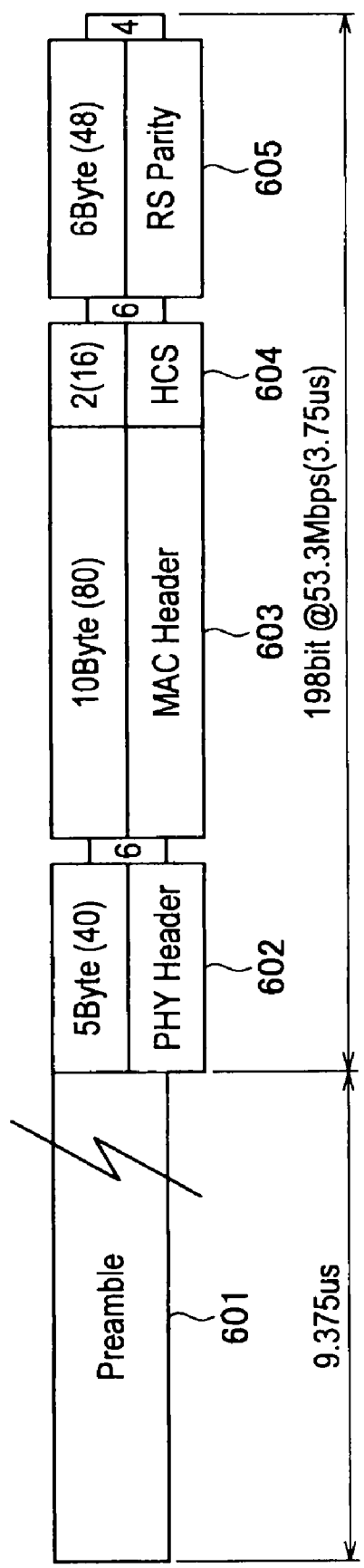
FIG. 3 is an explanatory diagram showing an example of the structure of a PHY frame.

FIG. 3 is an explanatory diagram showing an example of the structure of a PHY frame. As shown in FIG. 3, the PHY frame includes a preamble 601, a PHY header 602, a MAC header 603, a header check sequence (HCS) 604, and a Reed-Solomon (RS) parity 605. The preamble 601 is a known pattern signal that is used, for example, to perform synchronization when each of the wireless communication devices 10 performs reception processing, and is transmitted for 9.375 μs.

The PHY header 602 includes information indicating characteristics such as a transfer speed and a modulation scheme of the frame, and its data length is 5 bytes. The MAC header 603 includes management information, such as an address of the wireless communication device 10 that is a transmission source or destination of the frame, and its data length is 10 bytes. The HCS 604 functions to detect errors, and its data length is 2 bytes. Further, the data length of the RS parity 605 is 6 bytes. Therefore, if the tail bits are taken into consideration, when the transfer speed is 53.3 Mbps, it takes 3.75 μS to receive the PHY header 602 to the RS Parity 605.

Example of the Structure of a Beacon Frame

Figure 4:
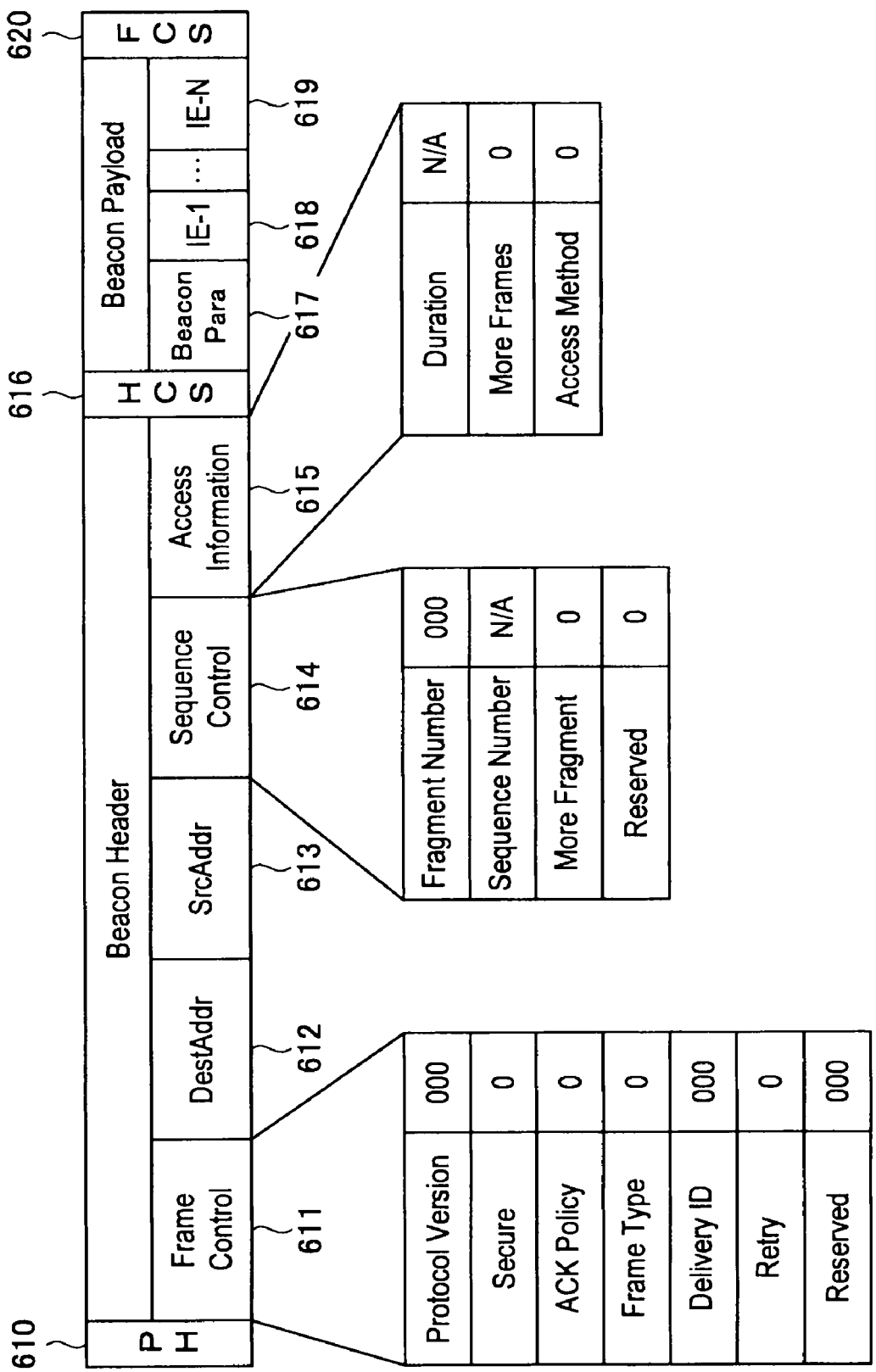
FIG. 4 is an explanatory diagram showing an example of the structure of a beacon frame.

FIG. 4 is an explanatory diagram showing an example of the structure of a beacon frame. As shown in FIG. 4, the beacon frame includes a physical layer header (PH) 610, a beacon header, a header check sequence (HCS) 616, a beacon payload, and a frame check sequence (FCS) 620.

The beacon header includes a frame control information (Frame Control) 611, a destination address (DestAddr) 612, a transmission source address (SrcAddr) 613, a sequence control information (Sequence Control) 614, and an access control information (Access Control) 615.

The beacon payload includes a beacon unique information (Beacon Parameter) 617, and a 1st information element (IE-1) 618 to an Nth information element-N (IE-N) 619.

DRP Reservation Information Element

FIG. 5 is an explanatory diagram showing an example of the structure of a DRP reservation information element that is an information element included in a beacon. As shown in FIG. 5, the DRP reservation information element includes an element ID 621 that indicates the type of the information element, an information length (Length) 622 of the information element, a DRP control information (DRP Control) 623 that indicates the reservation type etc. of the DRP reservation, an address that identifies a reservation target wireless communication device (Target/Owner DevAddr) 624, and an information-1 (DRP Allocation 1) 625 that indicates a slot group, for which the DRP reservation is performed, to an information-N (DRP Allocation N) 626.

PCA Availability Information Element

FIG. 6 is an explanatory diagram showing an example of the structure of a PCA availability information element that is an information element included in a beacon. As shown in FIG. 6, the PCA availability information element includes an element ID 631 that indicates the type of the information element, an information length (Length) 632 of the information element, an information (Interpretation) 633 that clearly explains the element, and an information (PCA Availability Bitmap) 634 that clearly specifies the slot position used for PCA.

Traffic Indication Map Information Element

FIG. 7 is an explanatory diagram showing an example of the structure of a traffic indication map information element that is an information element included in a beacon. As shown in FIG. 7, the traffic indication map information element includes an element ID 641 that indicates the type of the information element, an information length (Length) 642 of the information element, and a 1st address (DevAddr 1) 643, which indicates the counterpart device with which communication is performed using PCA, to an Nth address (DevAddr N) 644.

The wireless communication device 10 can identify the counterpart device with which communication is performed using PCA, and the slot to be used, by using the traffic indication map information element and the PCA availability information element.

Example of the Structure of an RTS Frame

Figure 8:
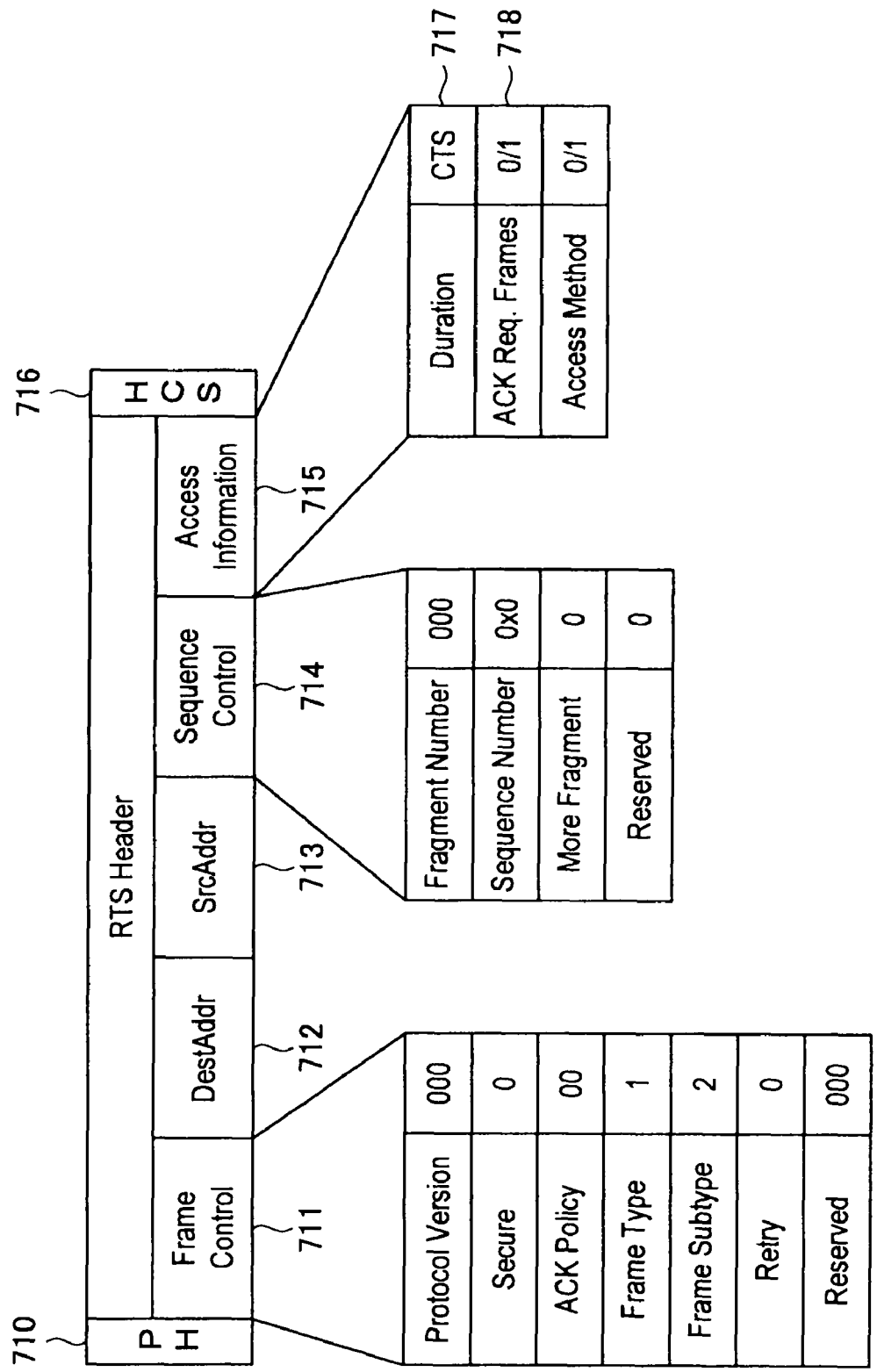
FIG. 8 is an explanatory diagram showing an example of the structure of an RTS frame.

FIG. 8 is an explanatory diagram showing an example of the structure of an RTS frame. As shown in FIG. 8, the RTS frame includes a physical layer header (PH) 710, an RTS header, and a header check sequence (HCS) 716.

The RTS header includes a frame control information (Frame Control) 711, a destination address (DestAddr) 712, a transmission source address (SrcAddr) 713, a sequence control information (Sequence Control) 714, and an access control information (Access Control) 715.

Note that the access control information 715 includes a duration information (Duration) field 717 that describes a time corresponding to a reception completion position of the CTS that is expected to be sent back. Note that the duration information field 717 may describe a time corresponding to a transmission completion position of the data to be transmitted.

Further, the access control information 715 includes a bit (ACK Req. Frames) 718 indicating whether or not there is a request to send back an ACK. In accordance with the bit 718 indicating whether there is the request to send back the ACK, the wireless communication device 10 that subsequently receives data can determine whether to transmit the ACK.

Example of the Structure of a CTS Frame

Figure 9:
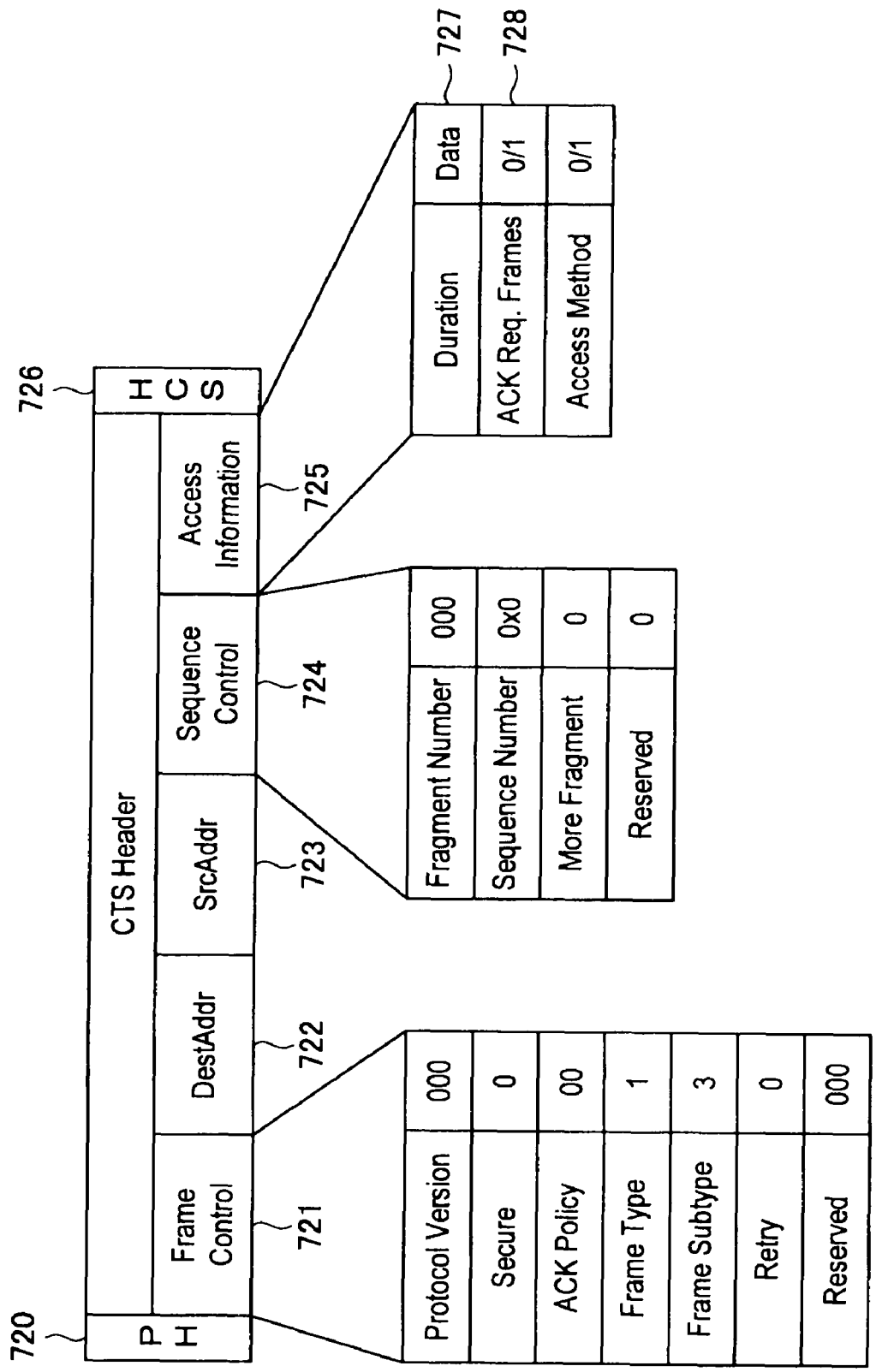
FIG. 9 is an explanatory diagram showing an example of the structure of a CTS frame.

FIG. 9 is an explanatory diagram showing an example of the structure of a CTS frame. As shown in FIG. 9, the CTS frame includes a physical layer header (PH) 720, a CTS header, and a header check sequence (HCS) 726. The CTS header includes a frame control information (Frame Control) 721, a destination address (DestAddr) 722, a transmission source address (SrcAddr) 723, a sequence control information (Sequence Control) 724, and an access control information (Access Control) 725.

Further, the access control information 725 includes a duration information (Duration) field 727 that describes a time corresponding to a reception completion position of the data to be received. Further, the access control information 725 includes a bit (ACK Req. Frames) 728 indicating whether or not an ACK can be sent back. The transmission source device of the CTS can describe whether or not an ACK can be sent back after completion of subsequent data transmission, in the bit 728 indicating whether or not the ACK can be sent back.

Example of the Structure of a WTS Frame

Figure 10:
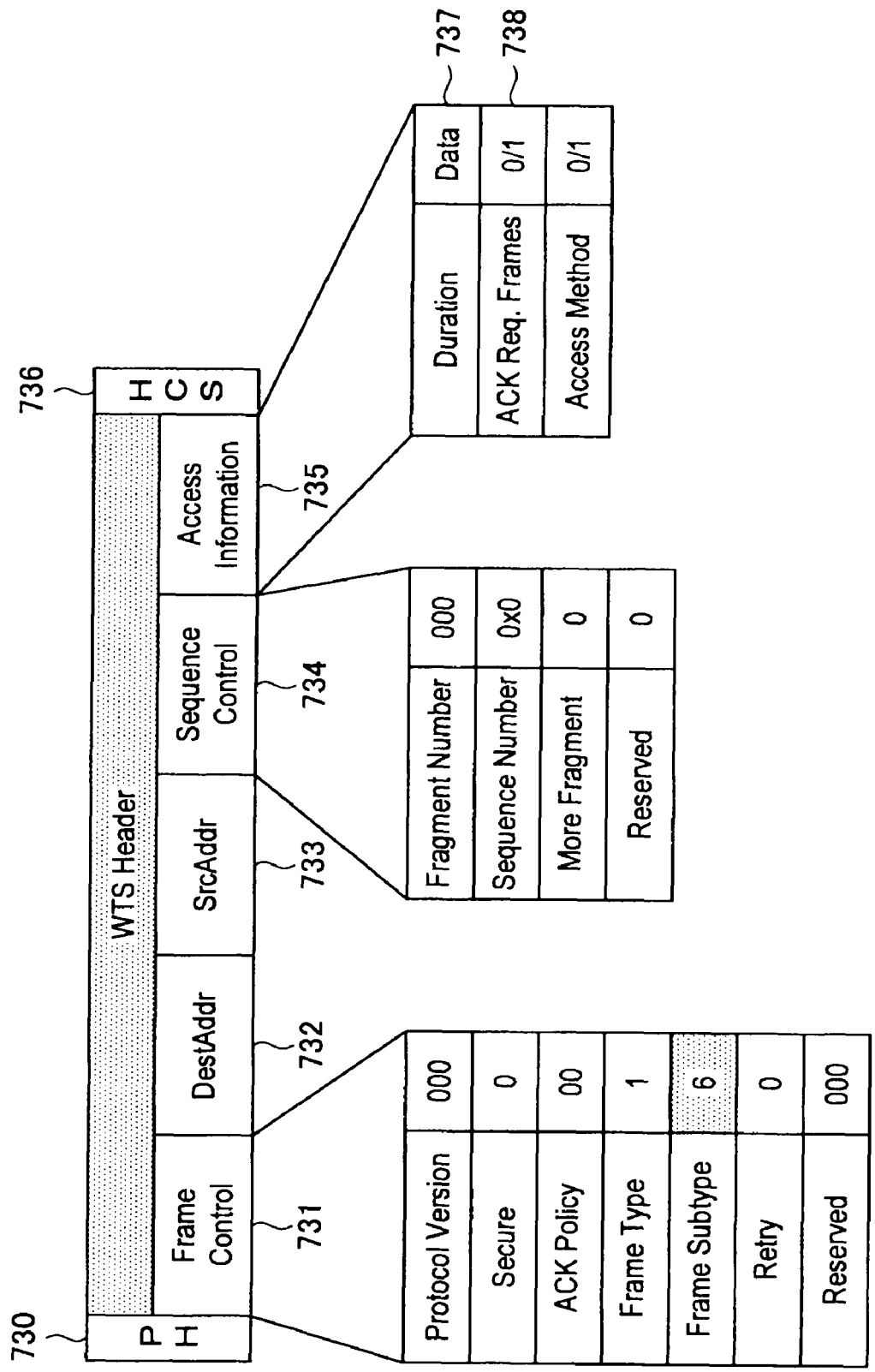
FIG. 10 is an explanatory diagram showing an example of the structure of a wait to send (WTS) frame.

FIG. 10 is an explanatory diagram showing an example of the structure of a wait to send (WTS) frame. The WTS frame functions as a transmission suspension signal that is transmitted when the transmission source device of the RTS is requested to suspend data transmission. As shown in FIG. 10, the WTS frame includes a physical layer header (PH) 730, a wait to send header (WTS Header), and a header check sequence (HCS) 736.

Further, the wait to send header includes a frame control information (Frame Control) 731, a destination address (DestAddr) 732, a transmission source address (SrcAddr) 733, a sequence control information (Sequence Control) 734, and an access control information (Access Control) 735. Note that, for example, "6" indicating that the frame is WTS is described in the frame subtype included in the frame control information 731.

Further, the access control information 735 includes a duration information (Duration) field 737 that describes a time corresponding to a waiting time. Further, the access control information 735 includes a bit (ACK Req. Frames) 738 indicating whether or not an ACK can be sent back. The transmission source device of the WTS can describe whether or not an ACK can be sent back after completion of subsequent data transmission, in the bit 738 indicating whether or not the ACK can be sent back.

Example of the Structure of a Data Frame

Figure 11:
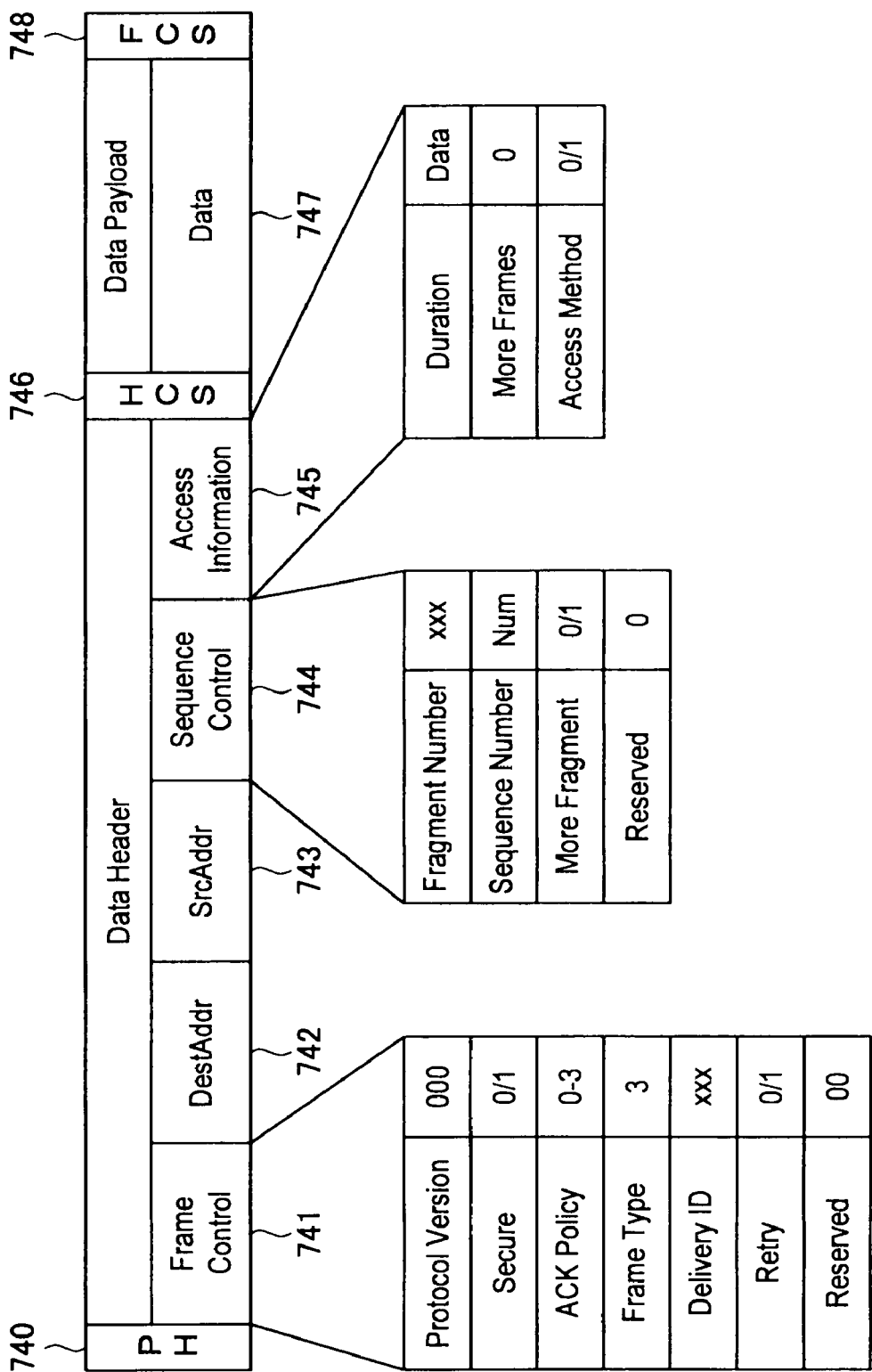
FIG. 11 is an explanatory diagram showing an example of the structure of a data frame.

FIG. 11 is an explanatory diagram showing an example of the structure of a data frame. As shown in FIG. 11, the data frame includes a physical layer header (PH) 740, a data header, a header check sequence (HCS) 746, a data payload 747 that is a payload of data to actually be transmitted, and a frame check sequence (FCS) 748.

The data header includes a frame control information (Frame Control) 741, a destination address (DestAddr) 742, a transmission source address (SrcAddr) 743, a sequence control information (Sequence Control) 744, and an access control information (Access Control) 745.

Example of the Structure of an ACK Frame

Figure 12:
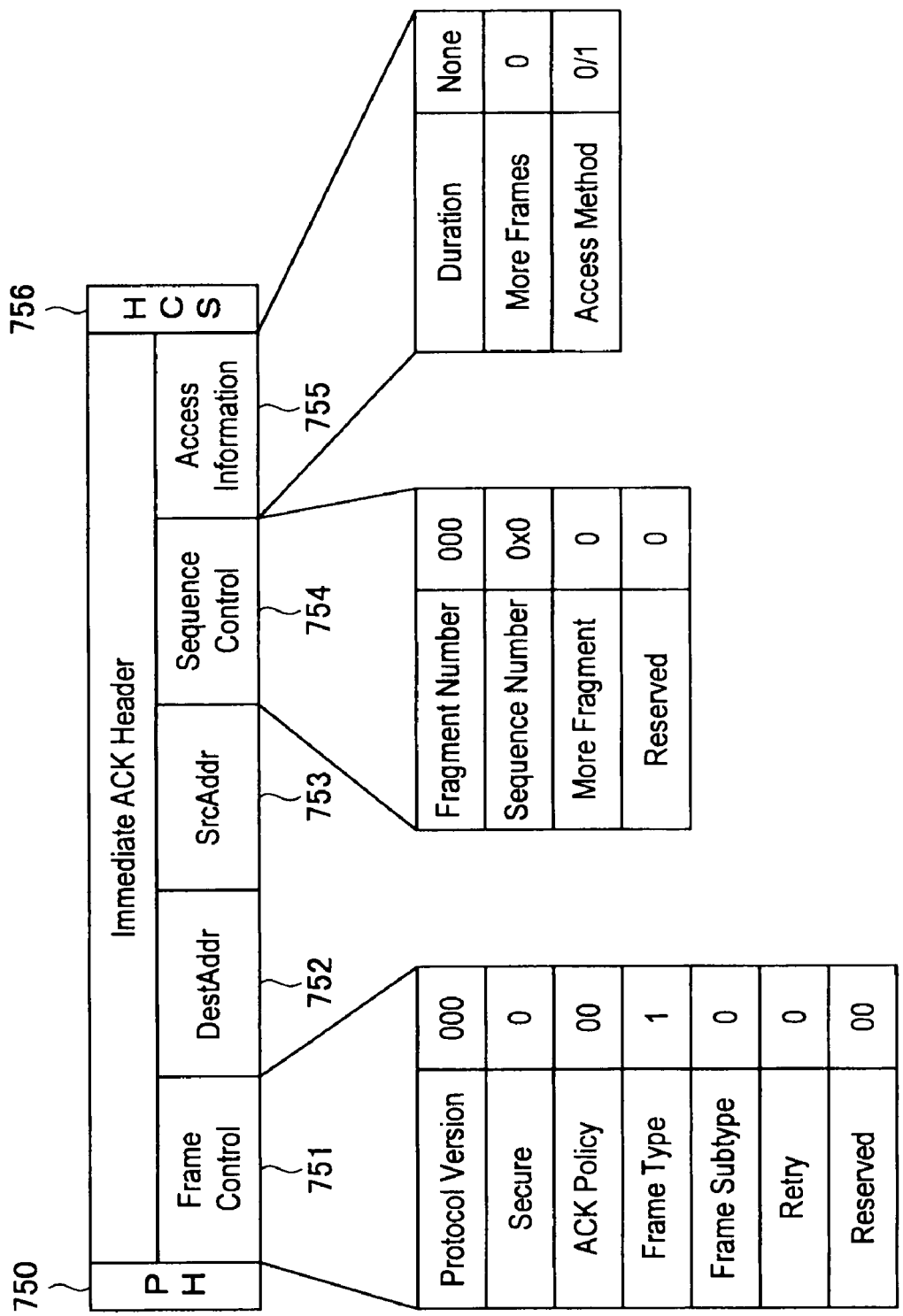
FIG. 12 is an explanatory diagram showing an example of the structure of an ACK (immediate ACK) frame.

FIG. 12 is an explanatory diagram showing an example of the structure of an ACK (immediate ACK) frame. As shown in FIG. 12, the ACK frame includes a physical layer header (PH) 750, an ACK header (Immediate ACK Header), and a header check sequence (HCS) 756.

The ACK header includes a frame control information (Frame Control) 751, a destination address (DestAddr) 752, a transmission source address (SrcAddr) 753, a sequence control information (Sequence Control) 754, and an access control information (Access Control) 755.

Block ACK Frame

Figure 13:
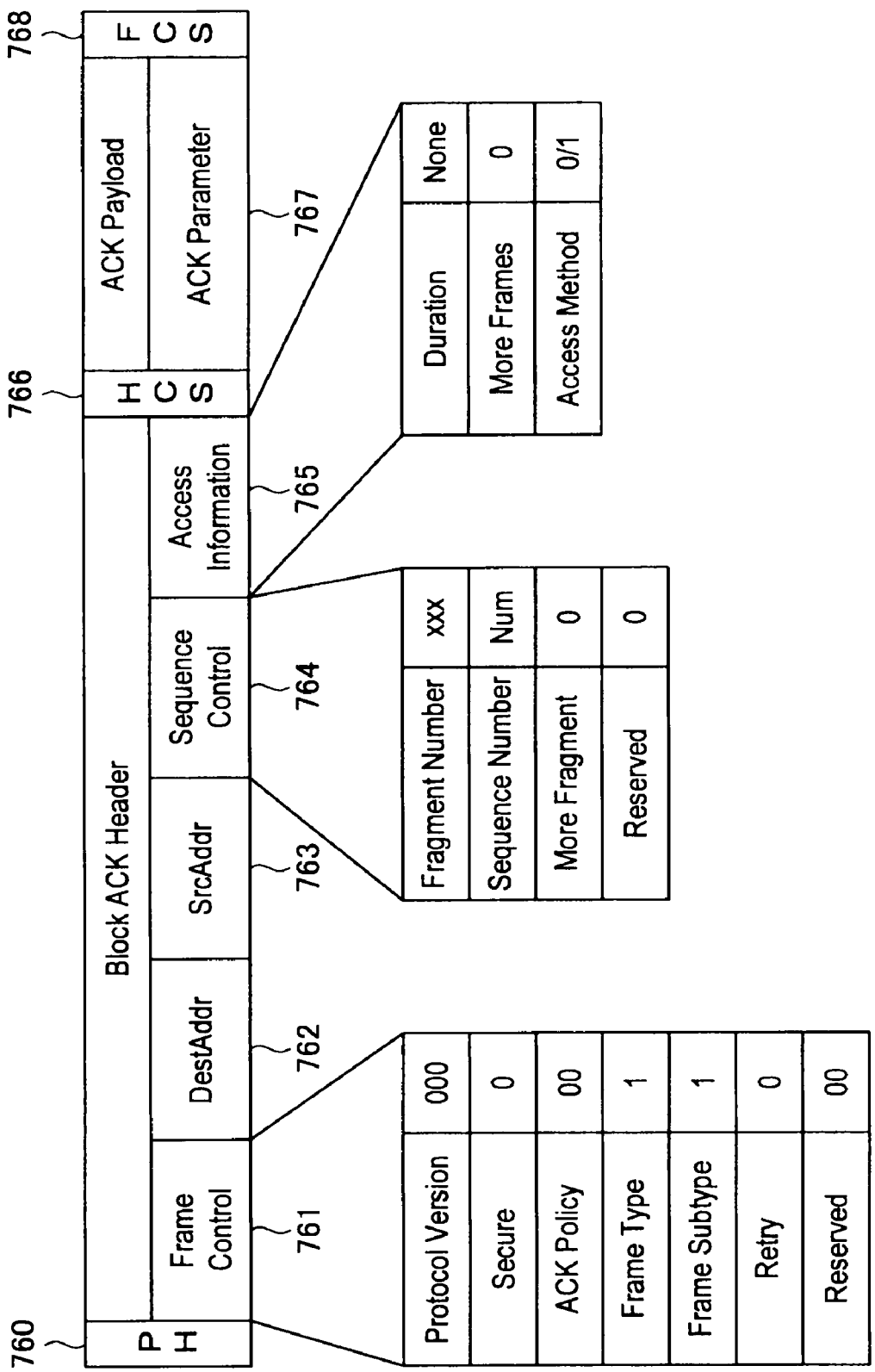
FIG. 13 is an explanatory diagram showing an example of the structure of a block ACK frame.

FIG. 13 is an explanatory diagram showing an example of the structure of a block ACK frame. The block ACK is a signal that notifies the communication counterpart of a data reception result when ACK transmission is requested by the communication counterpart (i.e., when a block ACK request is received).

As shown in FIG. 13, the block ACK frame includes a physical layer header (PH) 760, a block ACK header, a header check sequence (HCS) 766, an ACK information payload (ACK Payload) 767 of correctly received data, and a frame check sequence (FCS) 768.

2. Background of the Present Embodiment

Next, a wireless communication device 16 related to the present embodiment will be described with reference to FIG. 14 to FIG. 16.

Figure 14:
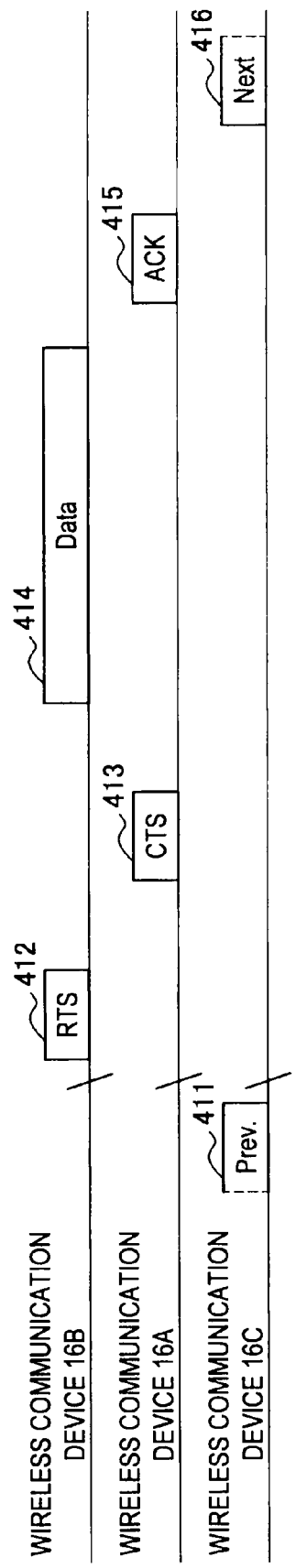
FIG. 14 is an explanatory diagram showing an example of access control performed by a wireless communication device related to the present embodiment.

FIG. 14 is an explanatory diagram showing an example of access control performed by the wireless communication device 16 related to the present embodiment. Note that, FIG. 14 to FIG. 16 show an example in which wireless communication devices 16B and 16C are within the communication range of a wireless communication device 16A, and the wireless communication device 16C is outside of the communication range of the wireless communication device 16B.

As shown in FIG. 14, the wireless communication device 16B transmits an RTS 412 addressed to the wireless communication device 16A when the wireless communication device 16A that is in the vicinity of the wireless communication device 16B does not perform communication. The wireless communication device 16A that has received the RTS 412 sends back a CTS 413 when the data requested by the RTS 412 can be transmitted (i.e., when conflict with other communication does not occur), because a communication 411 performed by the wireless communication device 16B has been completed and a predetermined access control time has elapsed.

Further, the wireless communication device 16B that has received the CTS 413 transmits a piece of data 414 addressed to the wireless communication device 16A. If the wireless communication device 16A correctly receives the data 414, it transmits an ACK 415 as a reception confirmation signal after the data 414 has been transmitted.

Note that, the use of the wireless transmission path is restricted by the RTS/CTS transmitted and received between the wireless communication device 16A and the wireless communication device 16B. Therefore, the other wireless communication device 16C can start a subsequent communication 416 after the transmission of the ACK 415 has been completed and the predetermined access control time has elapsed.

Figure 15:
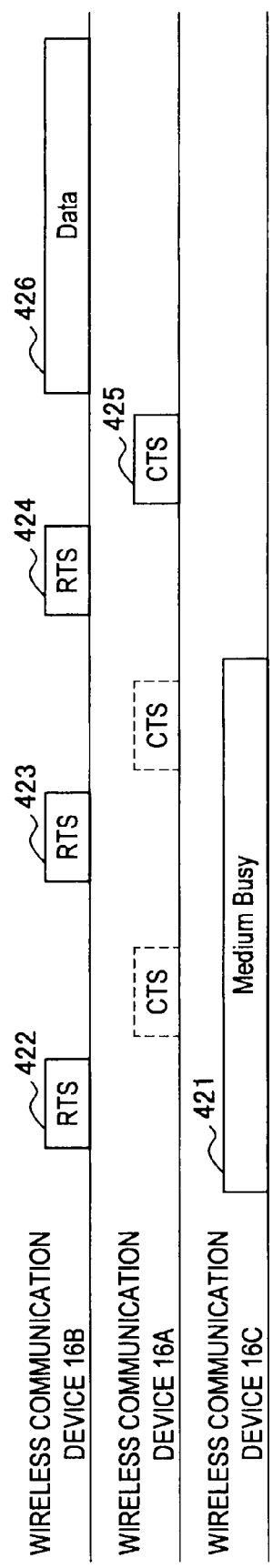
FIG. 15 is an explanatory diagram showing another example of the access control performed by the wireless communication device relating to the present embodiment.

FIG. 15 is an explanatory diagram showing another example of the access control performed by the wireless communication device 16 related to the present embodiment. As shown in FIG. 15, when a communication 421 performed by the wireless communication device 16C continues, even if the wireless communication device 16B transmits an RTS 422 addressed to the wireless communication device 16A, the wireless communication device 16A does not send a CTS back. Therefore, the wireless communication device 16B repeats transmission of RTS 423 and RTS 424.

After that, when the communication 421 performed by the wireless communication device 16C is completed, the wireless communication device 16A sends back a CTS 425 in response to an RTS 424, and the wireless communication device 16B transmits a piece of data 426 addressed to the wireless communication device 16A.

While the wireless transmission path is used in this manner by the wireless communication device 16C, the wireless communication device 16A repeatedly performs RTS retransmission. As a result, the use of wireless communication paths in the vicinity of the wireless communication device 16A is unduly restricted.

Figure 16:
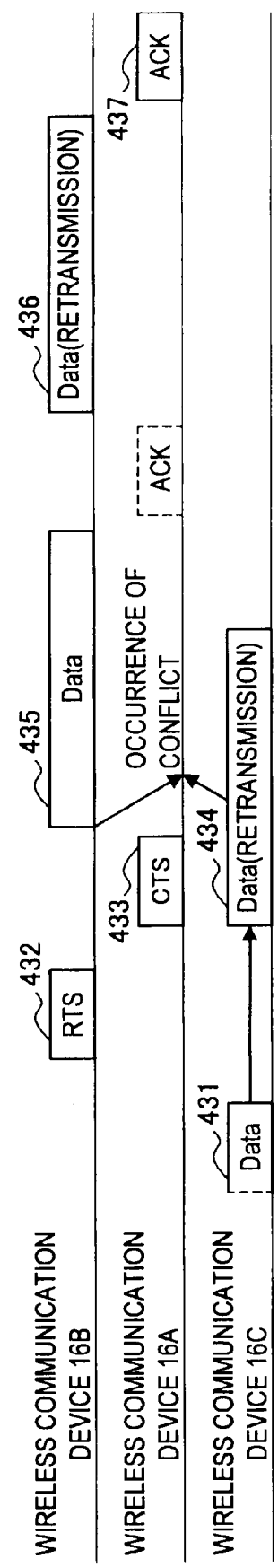
FIG. 16 is an explanatory diagram showing another example of the access control performed by the wireless communication device related to the present embodiment.

FIG. 16 is an explanatory diagram showing another example of the access control performed by the wireless communication device 16 related to the present embodiment. As shown in FIG. 16, if an RTS 432 addressed to the wireless communication device 16A is transmitted from the wireless communication device 16B after the wireless communication device 16C has completed the data transmission, the wireless communication device 16A sends back a CTS 433 because the wireless transmission path is available. As a result, the wireless communication device 16B starts to transmit a piece of data 435 addressed to the wireless communication device 16A.

However, if the wireless communication device 16C starts to retransmit a piece of data 434 when the CTS 433 is transmitted, the data 434 conflicts (collides) with the data 435 transmitted from the wireless communication device 16B, in the wireless communication device 16A. As a result, the wireless communication device 16A is not able to decode the data 435 correctly. Therefore, an ACK in response to the data 435 is not transmitted from the wireless communication device 16A, and the wireless communication device 16B retransmits a piece of data 436.

If the wireless communication device 16A can receive the data 436 correctly, it can transmit an ACK 437. However, if the data transmitted from the wireless communication device 16C conflicts again, the completion of the data transmission from the wireless communication device 16B is further delayed.

Thus, in light of the above-described circumstances, the wireless communication device 10 according to the present embodiment has been created. According to the wireless communication device 10 of the present embodiment, a new WTS frame is used to improve use efficiency of a wireless communication path. Hereinafter, the wireless communication device 10 according to the present embodiment will be described in detail with reference to FIG. 17 to FIG. 27.

Figure 17:
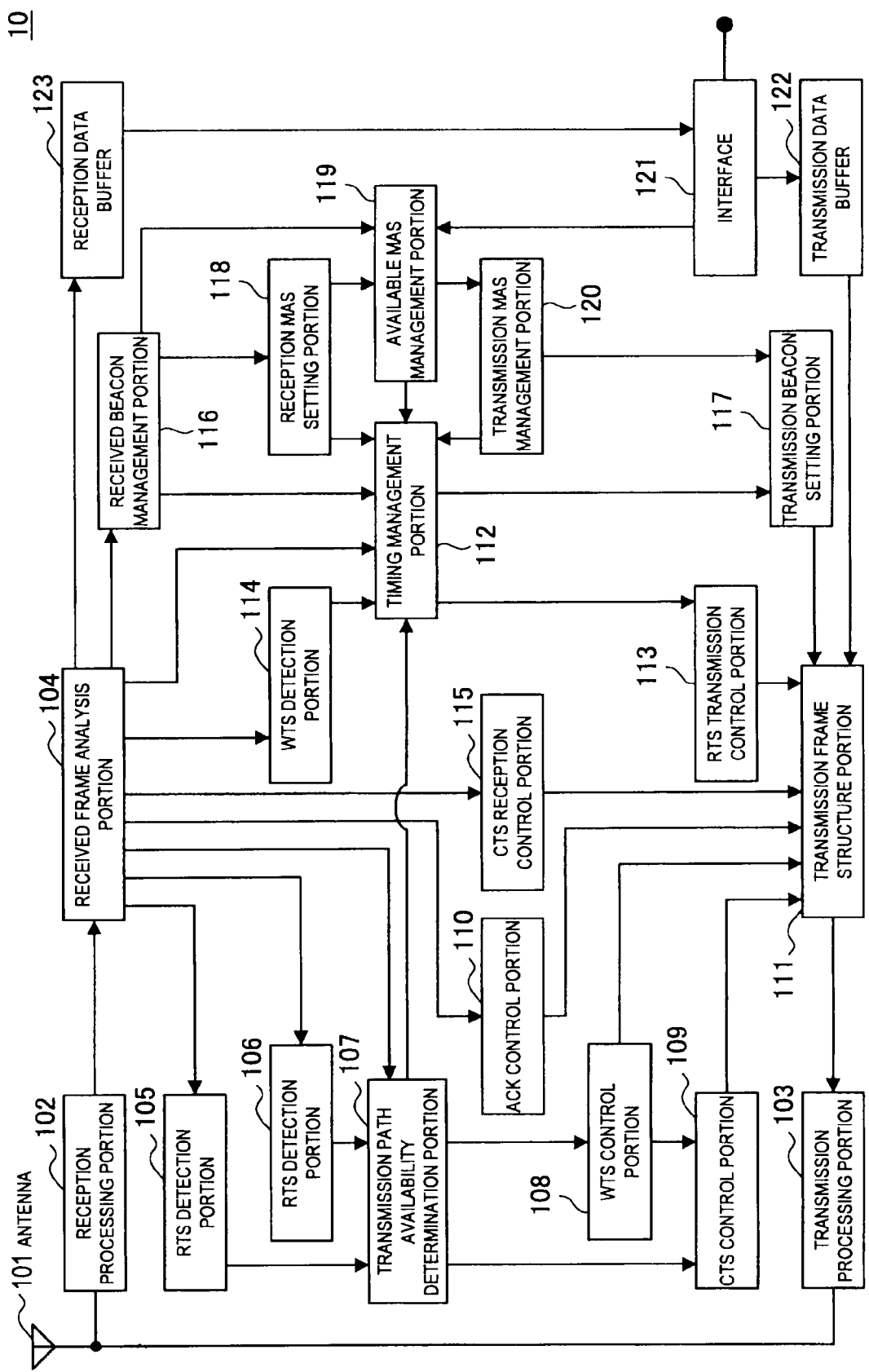
FIG. 17 is a functional block diagram showing the configuration of a wireless communication device according to the present embodiment.

3. Configuration of a Wireless Communication Device According to the Present Embodiment FIG. 17 is a functional block diagram showing the configuration of the wireless communication device 10 according to the present embodiment. As shown in FIG. 17, the wireless communication device 10 includes an antenna 101, a reception processing portion 102, a transmission processing portion 103, a received frame analysis portion 104, an RTS detection portion 105 for detecting an RTS addressed to the device itself, an RTS detection portion 106 for detecting an RTS addressed to another device, and a transmission path availability determination portion 107. Further, the wireless communication device 10 includes a WTS control portion 108, a CTS control portion 109, an ACK control portion 110, a transmission frame structure portion 111, a timing management portion 112, and an RTS transmission control portion 113. Furthermore, the wireless communication device 10 includes a WTS detection portion 114 for detecting a WTS addressed to the device itself, a CTS reception control portion 115 for performing reception control of a CTS addressed to the device itself, a received beacon management portion 116, a transmission beacon setting portion 117, a reception MAS setting portion 118, an available MAS management portion 119, and a transmission MAS management portion 120. In addition, the wireless communication device 10 includes an interface 121, a transmission data buffer 122, and a reception data buffer 123.

The antenna 101 is an interface with the wireless communication devices 10 in the vicinity, and functions as a reception portion that receives radio signals in cooperation with the reception processing portion 102. Further, the antenna 101 functions as a transmission portion that transmits radio signals in cooperation with the transmission processing portion 103.

The reception processing portion 102 performs radio signal reception processing, in synchronization with a preamble added to the radio signal (high-frequency ultra wideband signal) that is received by the antenna 101. For example, the reception processing portion 102 performs down conversion of the radio signal received by the antenna 101 to a base band signal, and converts it to a bit sequence.

The transmission processing portion 103 encodes information bits of various types of frames obtained from the transmission frame structure portion 111 to a transmission signal by performing signal processing. Further, the transmission processing portion 103 modulates the encoded transmission signal to a high frequency ultra wideband signal, and transmits it as a radio signal from the antenna 101.

The received frame analysis portion 104 analyzes parameters and the like described in the header section of the frame, for which the reception processing portion 102 has performed reception processing. When the frame is a data frame, a data section of the frame is stored in the reception data buffer 123.

The RTS detection portion 105 detects an RTS addressed to the device itself based on an analysis result of the received frame analysis portion 104. In a similar manner, the RTS detection portion 106 detects an RTS addressed to another device based on an analysis result of the received frame analysis portion 104.

The transmission path availability determination portion 107 manages the availability of the wireless transmission path based on an analysis result of the received frame analysis portion 104. For example, the transmission path availability determination portion 107 manages the duration in which data transmission is performed in the vicinity, based on a description of the Duration included in the received RTS, CTS, and data etc.

Further, when the RTS detection portion 105 detects an RTS addressed to the device itself, the transmission path availability determination portion 107 determines whether or not the data transmission to the device itself corresponding to the RTS conflicts with data transmission in the vicinity.

The WTS control portion 108 functions as a suspension control portion that performs WTS transmission control in accordance with a determination result of the transmission path availability determination portion 107. More specifically, the WTS control portion 108 performs the WTS transmission control when the transmission path availability determination portion 107 determines that conflict will occur.

The CTS control portion 109 functions as a response control portion that performs CTS transmission control in accordance with a determination result of the transmission path availability determination portion 107. More specifically, the CTS control portion 109 performs the CTS transmission control when the transmission path availability determination portion 107 determines that conflict will not occur.

The ACK control portion 110 performs transmission control of ACK when it is confirmed based on FCS that a data frame has been correctly received.

The transmission frame structure portion 111 structures transmission frames such as WTS, CTS and ACK etc., based on the control performed by the WTS control portion 108, the CTS control portion 109, the ACK control portion 110 and the like. The timing management portion 112 manages waiting time and the timing of back off setting and the like in the access control.

The RTS transmission control portion 113 functions as a transmission request control portion that performs RTS transmission control. Note that, in the wireless communication device related to the present embodiment, RTS is repeatedly transmitted until CTS reception is detected. As a result, the use of wireless communication paths in the vicinity is unduly restricted. On the other hand, the RTS transmission control portion 113 according to the present embodiment does not perform RTS retransmission control, when WTS is received but CTS is not received. As a result, it is possible to improve the use efficiency of the wireless transmission path. However, the RTS transmission control portion 113 performs the RTS retransmission control after a predetermined time has elapsed from the reception of the WTS. Details of this control will be described later in detail with reference to FIG. 25.

The WTS detection portion 114 detects a WTS addressed to the device itself based on an analysis result of the received frame analysis portion 104. In a similar manner, the CTS reception control portion 115 detects a CTS addressed to the device itself based on an analysis result of the received frame analysis portion 104. If the CTS reception control portion 115 detects the CTS addressed to the device itself, then it performs data frame transmission control.

The received beacon management portion 116 manages the wireless communication devices 10 within the vicinity based on the received beacon. Further, the transmission beacon setting portion 117 generates a beacon to be transmitted from the device itself.

The reception MAS setting portion 118 sets the MAS used for the device itself to perform reception processing based on, for example, a description of the DRP reservation information element included in the received beacon. In a similar manner, the transmission MAS management portion 120 sets the MAS used for the device itself to perform transmission processing. The available MAS management portion 119 manages a newly available MAS.

The interface 121 transfers the received data stored in the reception data buffer 123 to an application device, or receives the transmission data to be stored in the transmission data buffer 122 from the application device. The transmission data buffer 122 stores the transmission data obtained from the application device via the interface 121.

4. Operation of the Wireless Communication Device According to the Present Embodiment Next, an operation example of the wireless communication device 10 according to the present embodiment will be described with reference to FIG. 18 to FIG. 27. Note that, in the description below, it is assumed that each wireless communication device 10 has the positional relationship shown in FIG. 1. For example, it is assumed that the wireless communication device 10A can communicate with the wireless communication devices 10B and 10C that are included in the radio wave reachable range 12A, and the wireless communication device 10B is not able to directly communicate with the wireless communication device 10C that is not included in the radio wave reachable range 12B.

Figure 18:
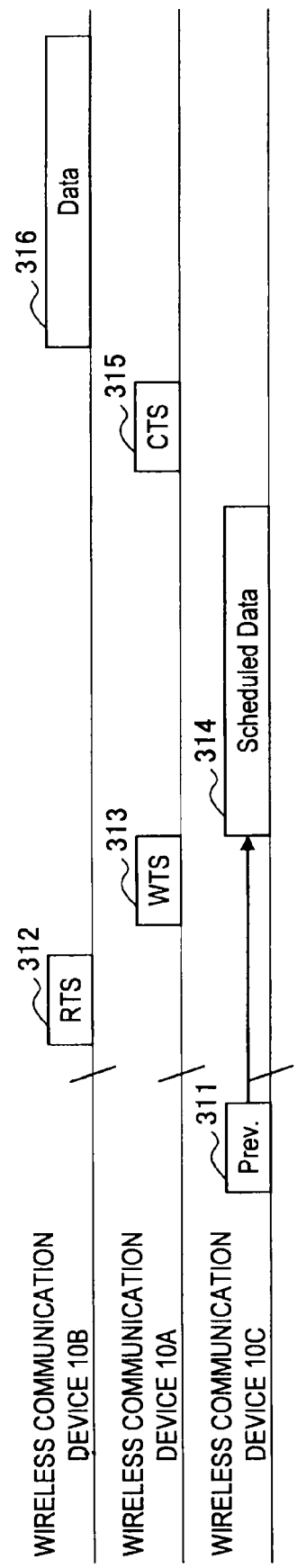
FIG. 18 is an explanatory diagram showing an example of access control performed by the wireless communication device according to the present embodiment.

FIG. 18 is an explanatory diagram showing an example of access control performed by the wireless communication device 10 according to the present embodiment. Let us consider a case where, as shown in FIG. 18, the use of the wireless transmission path has been scheduled in a previous communication 311 performed by the wireless communication device 10C, and the transmission path availability determination portion 107 has confirmed the availability of the wireless transmission path. In this case, if an RTS 312 addressed to the wireless communication device 10A is transmitted from the wireless communication device 10B, the WTS control portion 108 of the wireless communication device 10A performs transmission control of a WTS 313 at a timing requested by the RTS 312.

When the wireless communication device 10C completes the transmission of a scheduled piece of data 314, the CTS control portion 109 of the wireless communication device 10A performs transmission control of a CTS 315, and the wireless communication device 10B starts to transmit a piece of data 316.

Figure 19:
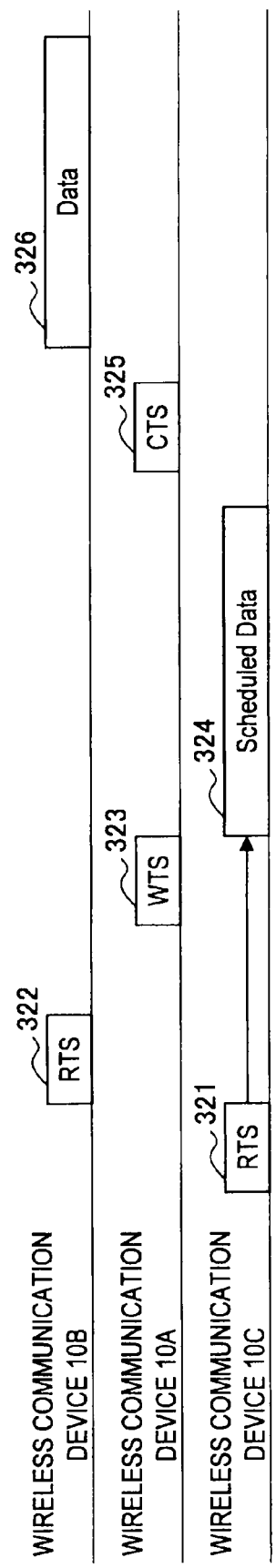
FIG. 19 is an explanatory diagram showing another example of the access control performed by the wireless communication device according to the present embodiment.

FIG. 19 is an explanatory diagram showing another example of the access control performed by the wireless communication device 10 according to the present embodiment. Let us consider a case where, as shown in FIG. 19, immediately after the wireless communication device 10A has detected an RTS 321 transmitted to another device from the wireless communication device 10C, the wireless communication device 10A detects an RTS 322 transmitted to the wireless communication device 10A from the wireless communication device 10B. In this case, the transmission path availability determination portion 107 of the wireless communication device 10A determines that, if the wireless communication device 10B performs data transmission following the RTS 322, this data transmission will conflict with the data transmission that will be performed following the RTS 321 by the wireless communication device 10C.

Therefore, in response to the RTS 322 transmitted from the wireless communication device 10B, the wireless communication device 10A transmits to the wireless communication device 10B a WTS 323 that requests the wireless communication device 10B to wait to send data until the wireless communication device 10A sends a CTS back.

When the wireless communication device 10C completes the transmission of a piece of data 324 that is scheduled by the RTS 321, the CTS control portion 109 of the wireless communication device 10A performs transmission control of a CTS 325, and the wireless communication device 10B starts to transmit a piece of data 326.

Figure 20:
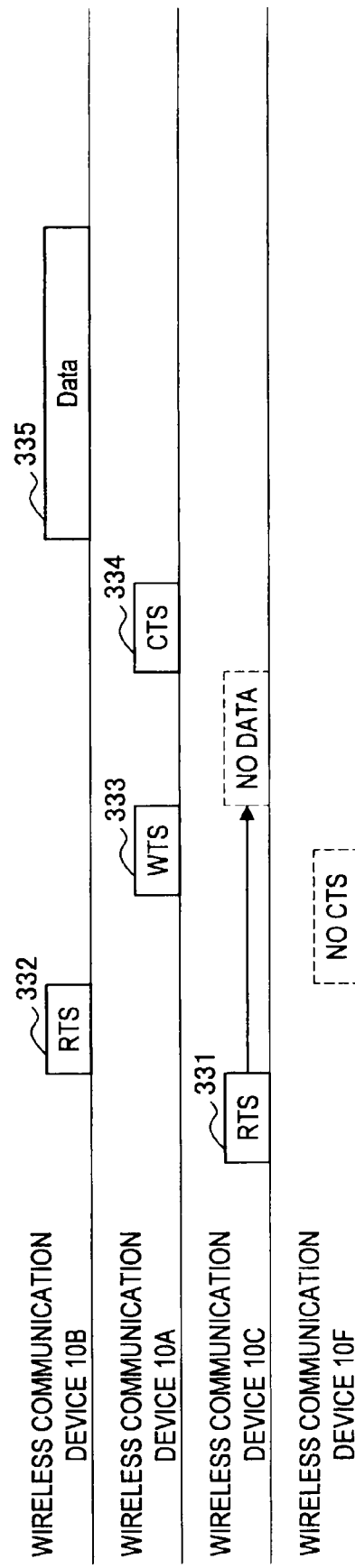
FIG. 20 is an explanatory diagram showing another example of the access control performed by the wireless communication device according to the present embodiment.

FIG. 20 is an explanatory diagram showing another example of the access control performed by the wireless communication device 10 according to the present embodiment. Let us consider a case where, as shown in FIG. 20, immediately after the wireless communication device 10A has detected an RTS 331 transmitted to the wireless communication device 10F (which corresponds to a hidden terminal from the viewpoint of the wireless communication device 10A) from the wireless communication device 10C, the wireless communication device 10A detects an RTS 332 transmitted to the wireless communication device 10A from the wireless communication device 10B. In this case, the transmission path availability determination portion 107 of the wireless communication device 10A determines that, if the wireless communication device 10B performs data transmission following the RTS 332, this data transmission will conflict with the data transmission that will be performed following the RTS 331 by the wireless communication device 10C.

Therefore, in response to the RTS 332 transmitted from the wireless communication device 10B, the wireless communication device 10A transmits to the wireless communication device 10B a WTS 333 that requests the wireless communication device 10B to wait to send data until the wireless communication device 10A sends a CTS back.

However, if the wireless communication device 10C does not receive the CTS in response to the RTS 331 from the wireless communication device 10F, data transmission from the wireless communication device 10C is not performed. In this case, the transmission path availability determination portion 107 of the wireless communication device 10A determines that data transmission from the wireless communication device 10B will not conflict. The CTS control portion 109 performs transmission control of a CTS 334, and the wireless communication device 10B starts to transmit a piece of data 335.

In this manner, according to the present embodiment, it is determined whether or not there is conflict, not only based on the description of the Duration included in each frame, but also on whether or not transmission is actually performed. Note that, whether or not transmission is actually performed can be determined based on, for example, a career sense in the reception processing portion 102, or a frame analysis in the received frame analysis portion 104.

Figure 21:
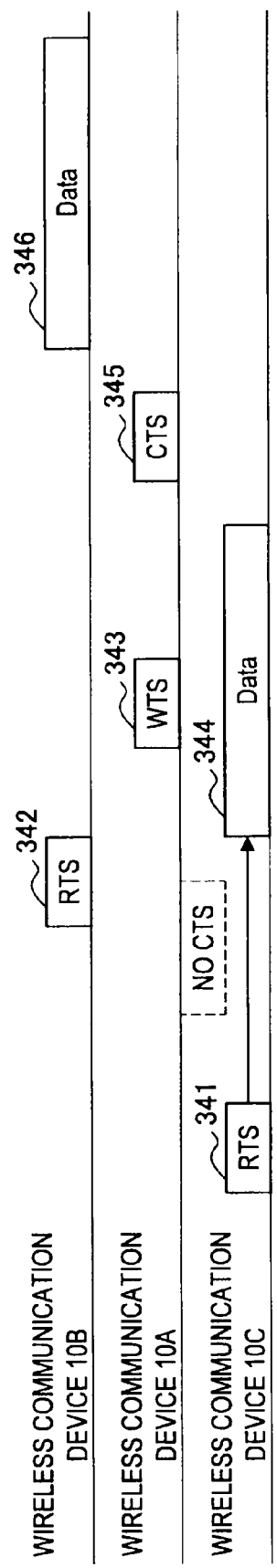
FIG. 21 is an explanatory diagram showing another example of the access control performed by the wireless communication device according to the present embodiment.

FIG. 21 is an explanatory diagram showing another example of the access control performed by the wireless communication device 10 according to the present embodiment. Let us consider a case where, as shown in FIG. 21, after the wireless communication device 10A has detected an RTS 341 transmitted to another device from the wireless communication device 10C, the wireless communication device 10A does not detect the CTS in response to the RTS 341 but detects an RTS 342 transmitted to the wireless communication device 10A from the wireless communication device 10B. In this case, the transmission path availability determination portion 107 of the wireless communication device 10A determines that, if the wireless communication device 10B performs data transmission following the RTS 342, this data transmission will conflict with the data transmission that will be performed following the RTS 341 by the wireless communication device 10C.

Therefore, in response to the RTS 342 transmitted from the wireless communication device 10B, the wireless communication device 10A transmits to the wireless communication device 10B a WTS 343 that requests the wireless communication device 10B to wait to send data until the wireless communication device 10A sends a CTS back. In this situation, the wireless communication device 10A has not detected the CTS in response to the RTS 341 transmitted to another device from the wireless communication device 10C. Therefore, even if the transmission of the WTS 343 from the wireless communication device 10A is performed concurrently with the data transmission from the wireless communication device 10C, the WTS 343 does not reach the other device. Thus, it is considered that correct data reception by the other device will not be interfered with.

When the wireless communication device 10C completes the transmission of a piece of data 344 that is scheduled by the RTS 341, the CTS control portion 109 of the wireless communication device 10A performs transmission control of a CTS 345, and the wireless communication device 10B starts to transmit a piece of data 346.

Figure 22:
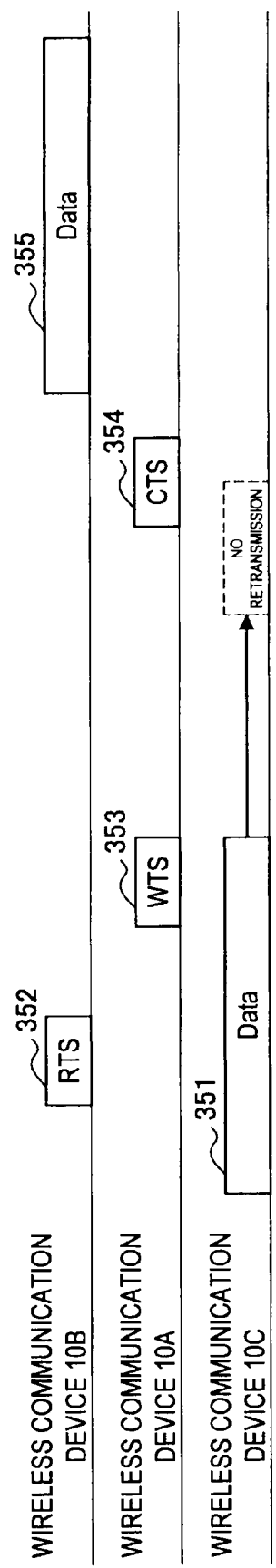
FIG. 22 is an explanatory diagram showing another example of the access control performed by the wireless communication device according to the present embodiment.

FIG. 22 is an explanatory diagram showing another example of the access control performed by the wireless communication device 10 according to the present embodiment. Let us consider a case where, as shown in FIG. 22, while the wireless communication device 10C is transmitting a piece of data 351 addressed to another device, the wireless communication device 10A detects an RTS 352 transmitted to the wireless communication device 10A from the wireless communication device 10B.

In this case, in response to the RTS 352 transmitted from the wireless communication device 10B, the wireless communication device 10A transmits to the wireless communication device 10B a WTS 353 that requests the wireless communication device 10B to wait to send data until the wireless communication device 10A sends a CTS back. Note that, even when the transmission of the WTS 353 from the wireless communication device 10A is performed concurrently with the data transmission from the wireless communication device 10C, if the wireless communication device 10A has not received a CTS from the other device, it is considered that correct data reception by the other device will not be interfered with.

After that, if the wireless communication device 10C completes the transmission of the data 351 and data retransmission from the wireless communication device 10C is not detected, the CTS control portion 109 of the wireless communication device 10A performs transmission control of a CTS 354, and the wireless communication device 10B starts to transmit a piece of data 355.

Figure 23:
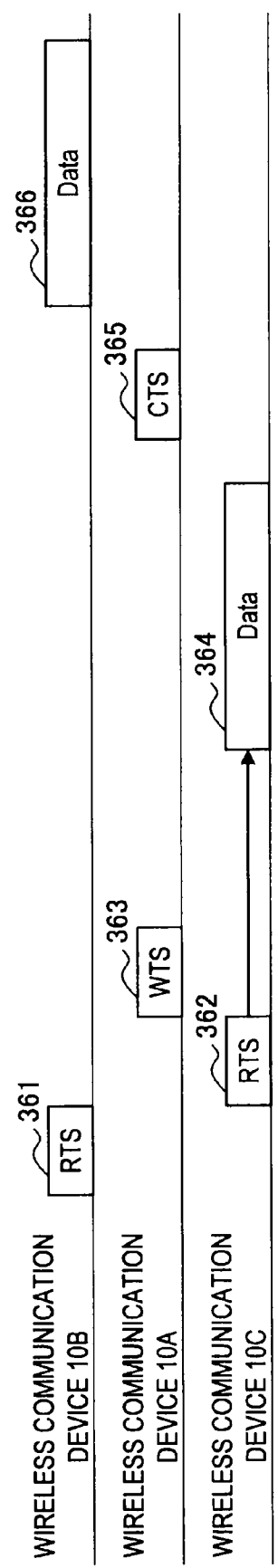
FIG. 23 is an explanatory diagram showing another example of the access control performed by the wireless communication device according to the present embodiment.

FIG. 23 is an explanatory diagram showing another example of the access control performed by the wireless communication device 10 according to the present embodiment. Let us consider a case where, as shown in FIG. 23, after the wireless communication device 10A has detected an RTS 361 transmitted to the wireless communication device 10A from the wireless communication device 10B, the wireless communication device 10C detects an RTS 362 transmitted to another device from the wireless communication device 10C. In this case, the transmission path availability determination portion 107 of the wireless communication device 10A determines that, if the wireless communication device 10B performs data transmission following the RTS 361, this data transmission will conflict with the data transmission that will be performed following the RTS 362 by the wireless communication device 10C.

Therefore, in response to the RTS 361 transmitted from the wireless communication device 10B, the wireless communication device 10A transmits to the wireless communication device 10B a WTS 363 that requests the wireless communication device 10B to wait to send data until the wireless communication device 10A sends a CTS back.

When the wireless communication device 10C completes the transmission of a piece of data 364 that is scheduled by the RTS 362, the CTS control portion 109 of the wireless communication device 10A performs transmission control of a CTS 365, and the wireless communication device 10B starts to transmit a piece of data 366.

Figure 24:
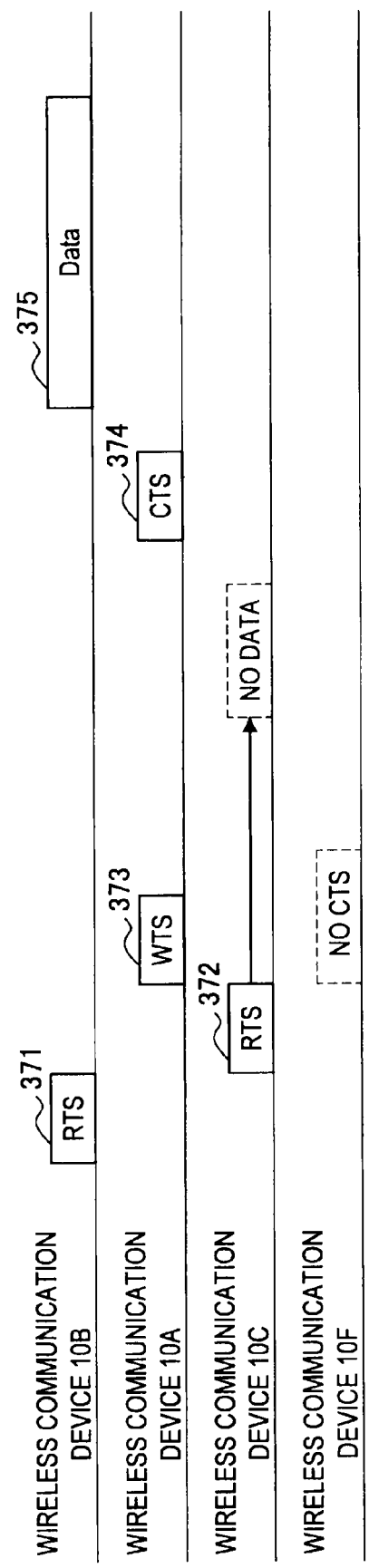
FIG. 24 is an explanatory diagram showing another example of the access control performed by the wireless communication device according to the present embodiment.

FIG. 24 is an explanatory diagram showing another example of the access control performed by the wireless communication device 10 according to the present embodiment. Let us consider a case where, as shown in FIG. 24, after the wireless communication device 10A has detected an RTS 371 transmitted to the wireless communication device 10A from the wireless communication device 10B, the wireless communication device 10A also detects an RTS 372 transmitted to the wireless communication device 10F (which corresponds to a hidden terminal from the viewpoint of the wireless communication device 10A) from the wireless communication device 10C. In this case, the transmission path availability determination portion 107 of the wireless communication device 10A determines that, if the wireless communication device 10B performs data transmission following the RTS 371, this data transmission will conflict with the data transmission that will be performed following the RTS 372 by the wireless communication device 10C.

Therefore, in response to the RTS 371 transmitted from the wireless communication device 10B, the wireless communication device 10A transmits to the wireless communication device 10B a WTS 373 that requests the wireless communication device 10B to wait to send data until the wireless communication device 10A sends a CTS back.

However, if the wireless communication device 10C does not receive the CTS in response to the RTS 372 from the wireless communication device 10F, data transmission from the wireless communication device 10C is not performed. In this case, the transmission path availability determination portion 107 of the wireless communication device 10A determines that data transmission from the wireless communication device 10B will not conflict. The CTS control portion 109 performs transmission control of a CTS 374, and the wireless communication device 10B starts to transmit a piece of data 375.

As described above, after the wireless communication device 10B has received WTS, the wireless communication device 10B transmits neither RTS nor data until it receives CTS. However, it is conceivable that, for example, the wireless communication device 10B fails to receive CTS correctly, or CTS is not transmitted from the wireless communication device 10A. Therefore, as shown in FIG. 25, the wireless communication device 10B may retransmit RTS if it does not receive CTS within a predetermined time after it has received WTS.

Figure 25:
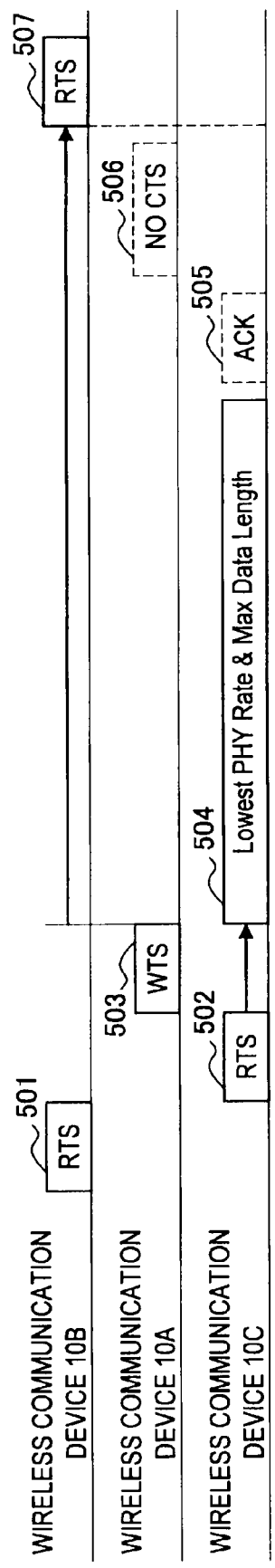
FIG. 25 is an explanatory diagram showing another example of the access control performed by the wireless communication device according to the present embodiment.

FIG. 25 is an explanatory diagram showing another example of the access control performed by the wireless communication device 10 according to the present embodiment. Let us consider a case where, as shown in FIG. 25, after the wireless communication device 10A has detected an RTS 501 transmitted to the wireless communication device 10A from the wireless communication device 10B, the wireless communication device 10A also detects an RTS 502 transmitted to another device from the wireless communication device 10C. In this case, the transmission path availability determination portion 107 of the wireless communication device 10A determines that, if the wireless communication device 10B performs data transmission following the RTS 501, this data transmission will conflict with the data transmission that will be performed following the RTS 502 by the wireless communication device 10C.

Therefore, in response to the RTS 501 transmitted from the wireless communication device 10B, the wireless communication device 10A transmits to the wireless communication device 10B a WTS 503 that requests the wireless communication device 10B to wait to send data until the wireless communication device 10A sends a CTS back.

However, even if the predetermined time has elapsed after the reception of the WTS 503, if the wireless communication device 10B does not receive CTS from the wireless communication device 10A, it retransmits an RTS 507. Note that the predetermined time may be set to the value obtained by adding a time to transmit a piece of data 504 with the maximum allowable data length, at the minimum PHY rate that is allowed by the communication protocol, a time to send back an ACK 505, and a time to send back a CTS 506.

Next, the flow of a wireless communication method that is performed in the wireless communication device 10 will be described with reference to FIG. 26 and FIG. 27.

Figure 26:
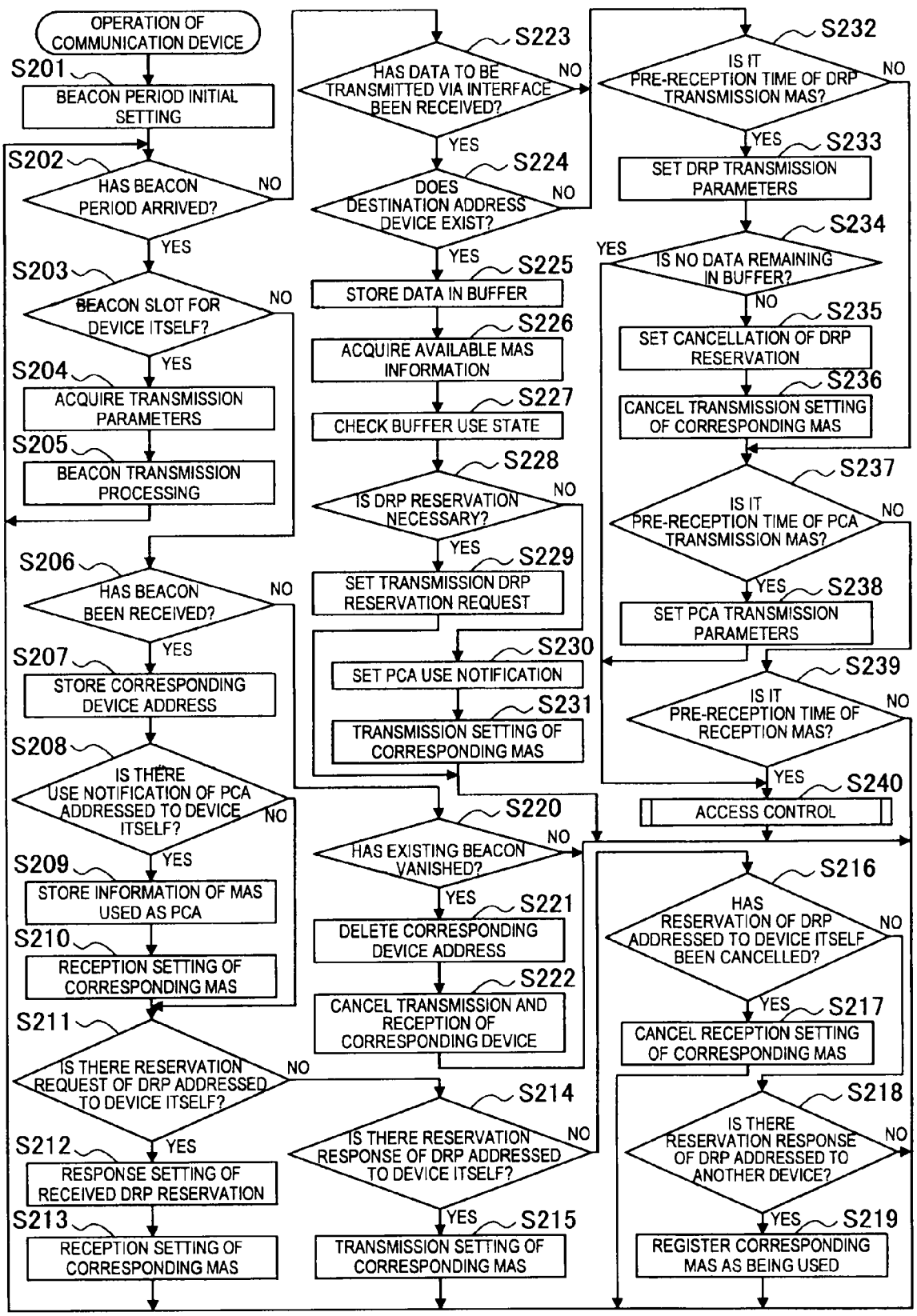
FIG. 26 is a flowchart showing the flow of a wireless communication method performed by the wireless communication device.
Figure 27:
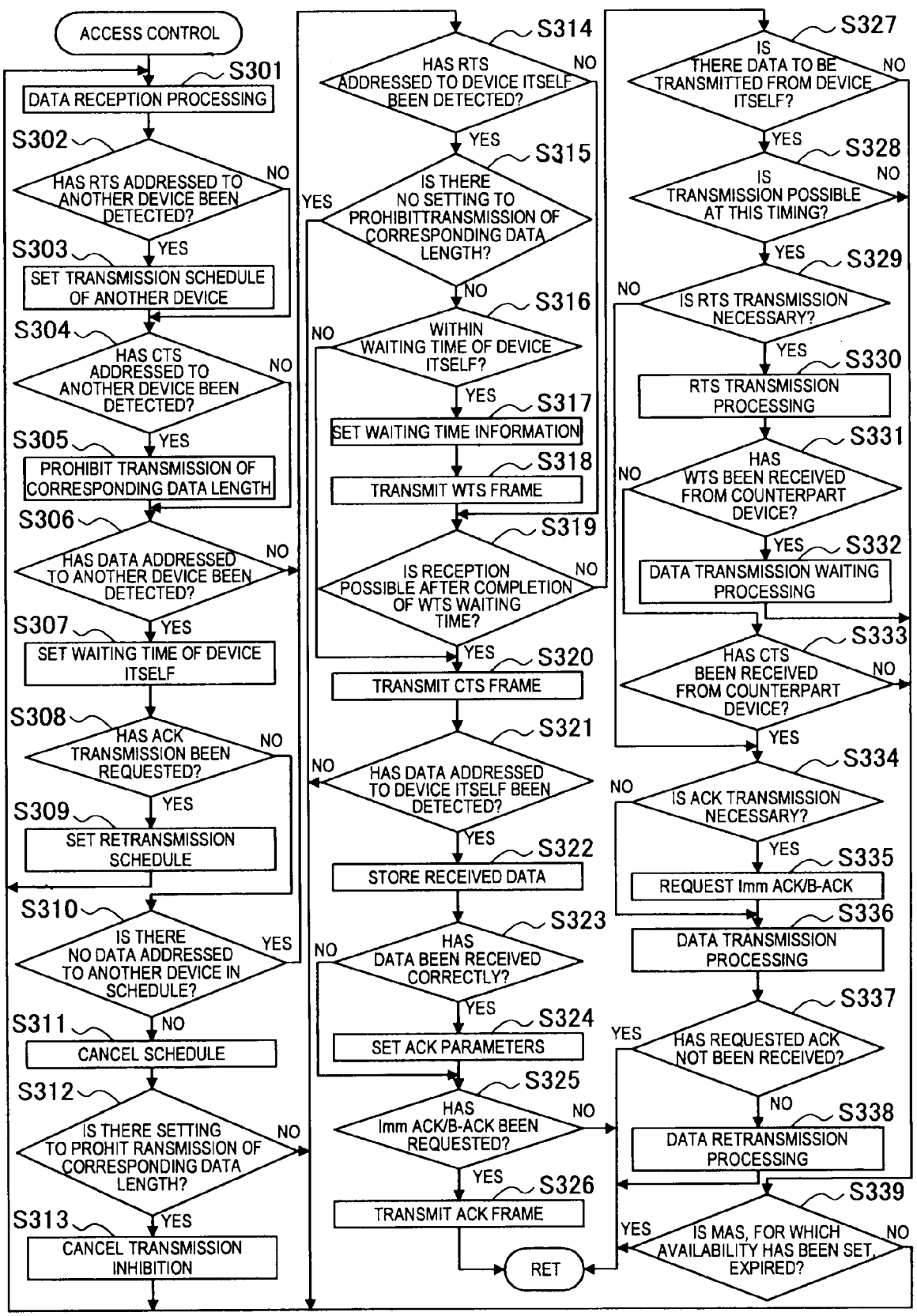
FIG. 27 is a flowchart showing the flow of the wireless communication method performed by the wireless communication device.

FIG. 26 and FIG. 27 are flowcharts showing the flow of the wireless communication method performed by the wireless communication device 10. As shown in FIG. 26, when a power supply is turned on, the wireless communication device 10 performs initial setting of a beacon period in accordance with a predetermined procedure, and determines a super frame cycle and a beacon slot position to be used by the device itself (step S201).

When a beacon period arrives (step S202), if it is a beacon slot for the device itself (step S203), the wireless communication device 10 acquires parameters of a beacon to be transmitted from the device itself and forms the beacon (step S204). Then, the wireless communication device 10 transmits the beacon (step S205). On the other hand, if the beacon period is not a beacon slot for the device itself, the wireless communication device 10 performs beacon reception. If a beacon is received (step S206), the wireless communication device 10 extracts a device address described in the beacon, and manages the device address (step S207).

If the received beacon includes a setting to use PCA communication that is addressed to the wireless communication device 10 (step S208), the wireless communication device 10 stores information about the MAS position used as PCA (step S209), and sets the reception in the MAS (step S210). Note that if the MAS is not particularly specified, reception setting is performed without specifying a particular period from the end of the beacon period.

When the received beacon includes a DRP reservation request that is addressed to the wireless communication device 10 (step S211), the wireless communication device 10 performs response setting of the DRP reservation in which the device itself is set as a receiving destination (step S212), and performs reception setting of the MAS specified by the reservation request (step S213). Further, when the received beacon includes a DRP reservation response addressed to the wireless communication device 10 (step S214), the wireless communication device 10 performs transmission setting of the MAS specified by the reservation response (step S215).

On the other hand, when the received beacon includes cancellation of the DRP reservation addressed to the wireless communication device 10 (step S216), the wireless communication device 10 cancels the setting of the reception in the MAS reserved by the corresponding DRP (step S217). When the received beacon includes a DRP reservation response addressed to another device (step S218), the wireless communication device 10 registers the MAS specified by the reservation response as a MAS in use (step S219).

When a beacon is not received for a predetermined period in an existing beacon slot in the beacon period (step S220), the wireless communication device 10 deletes the device address of the device that uses the beacon slot from the management target device addresses (step S221). Further, the wireless communication device 10 cancels the setting of the transmission to the above-described device that uses the beacon slot and the setting of the reception from the above-described device that uses the beacon slot (step S222).

In periods outside of the beacon period, the wireless communication device 10 receives data to be transmitted via the interface 121 (step S223). When the device address, which is a destination address, is managed (step S224), the wireless communication device 10 stores the data in the transmission data buffer 122 (step S225). Further, the wireless communication device 10 acquires information about the available MAS (step S226), and checks the use state of the transmission data buffer 122 (step S227). If DRP setting is necessary (step S228), the wireless communication device 10 sets a transmission DRP reservation request (step S229). On the other hand, if the DRP setting is not necessary, the wireless communication device 10 sets the use of PCA in order to transmit data (step S230), and sets the transmission of data in the MAS to be used (step S231).

When a pre-reception time arrives, which is ahead by a predetermined time from a DRP transmission MAS and is set to determine the availability of the transmission path (step S232), the wireless communication device 10 sets transmission parameters in the DRP reservation (step S233). Further, when there is data remaining in the transmission data buffer 122 (step S234), the process proceeds to a subroutine of the access control at step S240, and the wireless communication device 10 performs data transmission processing. On the other hand, when there is no data remaining in the transmission data buffer 122, the wireless communication device 10 sets the cancellation of the DRP reservation for the receiving destination communication device (step S235), and cancels the setting in the corresponding transmission MAS (step S236).

When a pre-reception time arrives, which is ahead by a predetermined time from a PCA transmission MAS and is set to determine the availability of the transmission path (step S237), the wireless communication device 10 sets parameters of a predetermined access control time until PCA transmission is performed (step S238). Further, the process proceeds to the subroutine of the access control at step S240, and the wireless communication device 10 performs data transmission processing.

Also when a pre-reception time arrives, which is ahead by a predetermined time from the MAS in which the reception setting of DRP or PCA was performed and is set to determine the availability of the transmission path (step S239), the process proceeds to the subroutine of the access control at step S240, and the wireless communication device 10 performs data reception processing. After completion of each processing, such as the subroutine of the access control at step S240, the series of processes from step S202 are repeatedly performed.

The subroutine of the access control shown at step S240 will be described below in detail. As shown in FIG. 27, first, the wireless communication device 10 performs data reception processing before transmitting data from the device itself (step S301). If the wireless communication device 10 detects an RTS addressed to another device (step S302), it sets the transmission schedule of the other device (step S303).

When the wireless communication device 10 detects a CTS addressed to another device (step S304), it performs setting to prohibit transmission for the period of the data length described in the Duration of the CTS (step S305). Further, when the wireless communication device 10 detects data addressed to another device (step S306), it sets the time during which the data is transmitted, as a waiting time for the device itself (step S307).

In this case, when an ACK transmission request is included in the data (step S308), the wireless communication device 10 sets, as the transmission schedule of another device, a time period until the timing at which data retransmission is expected to be started (step S309). On the other hand, when an ACK transmission request is not included in the data, if data addressed to another device is not transmitted until the timing at which the data retransmission is expected to be started, the wireless communication device 10 cancels the setting of the schedule (step S311). Further, if CTS is received and there is a setting to prohibit transmission of the data length (step S312), the wireless communication device 10 cancels the transmission prohibition (step S313).

Further, when the RTS detection portion 105 of the wireless communication device 10 detects an RTS addressed to the device itself (step S314), if there is no setting to prohibit transmission for a period of the data length of the RTS (step S315), and if the period is within the waiting time for the device itself (step S316), the WTS control portion 108 sets the waiting time as a parameter and performs the WTS transmission control (steps S317 and S318).

If the waiting time set for the WTS has elapsed and the reception of data addressed to the device itself is possible (step S319), the CTS control portion 109 of the wireless communication device 10 performs transmission control of a CTS frame (step S320).

After that, when the wireless communication device 10 detects data addressed to the device itself (step S321), it stores the detected data in the reception data buffer 123 (step S322). When the data is received correctly (step S323), the ACK control portion 110 sets ACK parameters (step S324). If an immediate ACK or a block ACK is requested (step S325), transmission control of the requested ACK is performed (step S326). With this, the series of subroutines of the access control related to the reception processing are completed.

When there is data to be transmitted from the device itself (step S327) and a timing that allows transmission of the data arrives in the access control (step S328), the RTS transmission control portion 113 determines whether or not RTS transmission is necessary (step S329). When the RTS transmission is necessary, the RTS transmission control portion 113 performs the RTS transmission control (step S330). Then, if WTS is received from the counterpart device, instead of CTS (step S331), the wireless communication device 10 maintains a data transmission waiting state (step S332).

When the wireless communication device 10 receives CTS from the counterpart device (step S333), it determines whether or not ACK transmission is necessary in the subsequent data transmission (step S334). When the ACK transmission is necessary, the wireless communication device 10 adds a bit commanding sending back of the immediate ACK or the block ACK (step S335) and performs data transmission (step S336). After that, if the wireless communication device 10 does not receive the requested ACK (step S337), it performs data retransmission (step S338). With this, the series of subroutines of the access control related to the transmission processing are completed.

When the wireless communication device 10 has no data to be transmitted from the device itself, when it is in a data waiting state, or when it does not receive CTS from the counterpart device, the wireless communication device 10 completes data transmission waiting processing (RET) after expiration of the MAS period for which the availability has been set in advance. In cases other than the above-described reception processing and transmission processing and the expiration of the MAS period, the process returns to step S301, and the series of access control processes are repeated.

5. Summary and Supplement

As described above, according to the present embodiment, when the receiving destination device that receives an RTS requests suspension of data transmission to the device itself, it sends a WTS back. Thus, it is possible to clearly notify the transmission source device that transmitted the RTS that the wireless transmission path is not available. Therefore, when the transmission source device that transmitted the RTS receives the WTS, it can confirm that the wireless transmission path is being used. Thus, unnecessary RTS retransmission can be avoided.

Further, according to the present embodiment, after the receiving destination device that receives an RTS sends a WTS back to the transmission source device that transmitted the RTS addressed to the device itself, it sends back a CTS. Therefore, even if the Length of the subsequently transmitted data is not described in an RTS addressed to another device, after completion of the data transmission, the receiving destination device that receives the RTS can notify the transmission source device that transmitted the RTS that the transmission path is now available.

Further, according to the present embodiment, the receiving destination device that receives an RTS sends back a WTS before the start of the transmission of scheduled data. Thus, conflict with another communication can be avoided. Further, when the transmission of the scheduled data is completed after the WTS has been sent back, the receiving destination device that receives the RTS sends back a CTS and thereby restarts the transmission of data addressed to the device itself. Thus, conflict with another communication can be avoided.

Further, according to the present embodiment, if the wireless communication device 10 receives an RTS addressed to the device itself immediately after it has received an RTS addressed to another device, the wireless communication device 10 sends back a WTS and thereby suspends the transmission of data addressed to the device itself. Thus, conflict with another communication can be avoided. Further, after the wireless communication device 10 has sent back the WTS, if the data transmission corresponding to the RTS addressed to the other device is not started, the wireless transmission path becomes vacant. In this case, the wireless communication device 10 sends back a CTS. As a result, it is possible to inhibit the loss of a data transmission opportunity, and to improve the use efficiency of the wireless transmission path.

Further, according to the present embodiment, after the wireless communication device 10 has received an RTS addressed to another device, if it does not receive a CTS in response to the RTS and if it detects an RTS addressed to the device itself, the wireless communication device 10 sends back a WTS concurrently with the transmission of data addressed to the other device. Thus, it is possible to improve the use efficiency of the wireless transmission path. The wireless communication device 10 can restart the transmission of data addressed to the device itself, by sending back a CTS after the communication of the data addressed to the other device has been completed.

Furthermore, the wireless communication device 10 can obtain a more reliable access control method, by sending back a CTS after it has detected that the retransmission of data addressed to another device is not performed. Further, after the wireless communication device 10 has sent back a WTS based on the reception of an RTS addressed to the device itself and an RTS addressed to another device, if the wireless communication device 10 detects the transmission of data addressed to the other device, conflict can be avoided by sending back a CTS after completion of the data transmission.

Moreover, after the wireless communication device 10 has sent back a WTS based on the reception of an RTS addressed to the device itself and an RTS addressed to another device, if the wireless communication device 10 does not detect the transmission of data addressed to the other device, it is determined that the wireless transmission path is vacant. Therefore, the wireless communication device 10 sends a CTS back. As a result, the wireless communication device 10 can inhibit the loss of a data transmission opportunity due to itself and another device both unnecessarily restricting each other's actions, i.e., in this case with the transmission source device that transmitted the RTS addressed to the other device. Thus, it is possible to improve the use efficiency of the wireless transmission path.

Although, the exemplary embodiment of the present invention is described above with reference to the appended drawing, it is needless to mention that the present invention is not limited to the examples described above. It should be understood by those skilled in the art that various modifications, combinations, sub-combinations and alterations may occur depending on design requirements and other factors insofar as they are within the scope of the appended claims or the equivalents thereof.

For example, each step of the processing performed by the wireless communication device 10 described in this specification does not have to be performed in time series in line with the order detailed in the flow chart. Instead, each step of the processing performed by the wireless communication device 10 may include processing that is performed in parallel or individually (for example, parallel processing or object oriented processing).

Further, a computer program can also be created that causes hardware such as a CPU, a ROM, and a RAM that are built into the wireless communication device 10 to perform functions that are the same as each structural element of the above-described wireless communication device 10. A storage medium that stores the computer program is also provided. If each function block shown by the functional block diagram in FIG. 17 is structured by hardware, a series of processing can be realized by hardware.

The present application contains subject matter related to that disclosed in Japanese Priority Patent Application JP 2008-287514 filed in the Japan Patent Office on 10 Nov. 2008, the entire content of which is hereby incorporated by reference.

What is claimed is:

1. A wireless communication device, comprising:
 a reception portion that receives a transmission request signal addressed to the wireless communication device that is transmitted from a counterpart communication device;
 a determination portion that, when the reception portion receives the transmission request signal addressed to the wireless communication device, determines whether data transmission from the counterpart communication device is possible, based on an availability of a wireless transmission path, the determination portion setting a transmission prohibited period when receiving a response signal addressed to another wireless communication device;
 wherein the determination portion sets the transmission prohibited period for a time period equal to a duration of the response signal addressed to the another wireless communication device;
 a suspension control portion that, when it is determined that the data transmission from the counterpart communication device is not possible and the transmission prohibited period is not set, performs transmission control of a suspension request signal that requests suspension of the data transmission; and
 a response control portion that, when the determination portion determines that the data transmission from the counterpart communication device is possible after the transmission control of the suspension request signal, performs transmission control of a response signal in response to the transmission request signal addressed to the wireless communication device.

2. The wireless communication device according to claim 1, wherein when the data transmission from the counterpart communication device conflicts with data transmission from another wireless communication device, the determination portion determines that the data transmission from the counterpart communication device is not possible, and when the data transmission from the counterpart communication device does not conflict with data transmission from other wireless communication devices, the determination portion determines that the data transmission from the counterpart communication device is possible.

3. The wireless communication device according to claim 2, wherein the determination portion detects that the data transmission from the other wireless communication device is performed, based on reception by the reception portion of a transmission request signal transmitted from the other wireless communication device.

4. The wireless communication device according to claim 3, wherein the determination portion determines that the data transmission from the counterpart communication device is possible after the data transmission from the other wireless communication device is completed.

5. The wireless communication device according to claim 4, wherein if data retransmission from the other wireless communication device is not performed in a predetermined time after the data transmission from the other wireless communication device, the determination portion determines that the data transmission from the counterpart communication device is possible.

6. A wireless communication device, comprising:
a transmission request control portion that performs transmission control of a transmission request signal to a counterpart communication device; and
a transmission portion that performs data transmission when a response signal in response to the transmission request signal is received from the counterpart communication device,
wherein the transmission request control portion performs retransmission control of the transmission request signal when both the response signal and a suspension request signal are not received after the transmission control of the transmission request signal and a predetermined time has passed after transmission control of the transmission request signal, and the transmission request control portion does not perform the retransmission control of the transmission request signal when the suspension request signal is received and;
wherein the predetermined time is equal to a time to transmit a piece of data with a maximum allowable data length at a minimum rate that is allowed, plus a time to send back an acknowledgment, plus a time to send back a clear to send signal.

7. The wireless communication device according to claim 6, wherein the transmission request control portion performs the retransmission control of the transmission request signal when the response signal is not received in a predetermined time after the suspension request signal has been received.

8. A wireless communication system, comprising: a first wireless communication device; and a second wireless communication device including
a reception portion that receives a transmission request signal addressed to the second wireless communication device that is transmitted from the first wireless communication device,
a determination portion that, when the reception portion receives the transmission request signal addressed to the second wireless communication device, determines whether data transmission from the first wireless communication device is possible, based on an availability of a wireless transmission path, the determination portion setting a transmission prohibited period when receiving a response signal addressed to another wireless communication device,
wherein the determination portion sets the transmission prohibited period for a time period equal to a duration of the response signal addressed to the another wireless communication device;

a suspension control portion that, when it is determined that the data transmission from the first wireless communication device is not possible and the transmission prohibited period is not set, performs transmission control of a suspension request signal that requests suspension of the data transmission, and a response control portion that, when the determination portion determines that the data transmission from the first wireless communication device is possible after the transmission control of the suspension request signal, performs transmission control of a response signal in response to the transmission request signal addressed to the second wireless communication device, wherein the first wireless communication device performs retransmission control of the transmission request signal when both the response signal and the suspension request signal are not received after the transmission control of the transmission request signal, and the first wireless communication device does not perform the retransmission control of the transmission request signal when the suspension request signal is received.

9. A wireless communication method, comprising:
receiving a transmission request signal addressed to the wireless communication device that is transmitted from a counterpart communication device;
determining, based on an availability of a wireless transmission path, whether data transmission from the counterpart communication device is possible;
setting a transmission prohibited period when receiving a response signal addressed to another wireless communication device;
wherein the transmission prohibited period is set for a time period equal to a duration of the response signal addressed to the another wireless communication device;
performing transmission control of a suspension request signal that requests suspension of the data transmission, when it is determined that the data transmission from the counterpart communication device is not possible and the transmission prohibited period is not set; and
performing transmission control of a response signal in response to the transmission request signal addressed to the wireless communication device, when the data transmission from the counterpart communication device becomes possible after the transmission control of the suspension request signal.

10. A wireless communication method, comprising:
performing transmission control of a transmission request signal to a counterpart communication device; and
performing data transmission when a response signal in response to the transmission request signal is received from the counterpart communication device,
wherein retransmission control of the transmission request signal is performed when both the response signal and a suspension request signal are not received after the transmission control of the transmission request signal and a predetermined time has passed after transmission control of the transmission request signal, and the retransmission control of the transmission request signal is not performed when the suspension request signal is received; and
wherein the predetermined time is equal to a time to transmit a piece of data with a maximum allowable data length at a minimum rate that is allowed, plus a time to send back an acknowledgment, plus a time to send back a clear to send signal.

* * * * *